(12) United States Patent     (10) Patent No.: US 8,171,119 B2
Tameshige et al.     (45) Date of Patent: *May 1, 2012

(54) PROGRAM DEPLOYMENT APPARATUS AND METHOD

(75) Inventors: Takashi Tameshige, Tokyo (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/009,909

(22) Filed: Jan. 20, 2011

(65) Prior Publication Data

US 2011/0113127 A1    May 12, 2011

Related U.S. Application Data

(63) Continuation of application No. 12/191,767, filed on Aug. 14, 2008, now Pat. No. 7,890,613.

(30) Foreign Application Priority Data

May 19, 2008 (JP) .................................. 2008-130677

(51) Int. Cl.
    *G06F 15/177* (2006.01)
    *G06F 15/173* (2006.01)

(52) U.S. Cl. ....................................... 709/220; 709/223

(58) Field of Classification Search .................. 709/222, 709/223, 220
See application file for complete search history.

(56) References Cited

U.S. PATENT DOCUMENTS

| 7,206,827 | B2 | 4/2007 | Viswanath et al. |
| 7,373,661 | B2 | 5/2008 | Smith et al. |
| 2009/0070771 | A1 | 3/2009 | Yuyitung et al. |
| 2009/0217255 | A1 | 8/2009 | Troan |
| 2009/0328225 | A1 | 12/2009 | Chambers et al. |

FOREIGN PATENT DOCUMENTS

| JP | 2000276332 | 10/2000 |
| JP | 200758664 | 3/2007 |

*Primary Examiner* — Asghar Bilgrami
(74) *Attorney, Agent, or Firm* — Mattingly & Malur, PC

(57) ABSTRACT

With a management server that is connected via a network to at least one physical server including a physical server with a virtualization facility for providing a virtual server to a client and deploys a program to the at least one physical server as necessary, and by a program deployment method for such a management server for deploying a program to the at least one physical server as necessary, there is provided units for detecting one or more nodes which are any of the physical server, the virtualization facility, and the virtual server and connected via the network, acquiring first configuration information about a virtual layer of each detected node for each detected node, and selectively deploying the program to the relevant node based on the first configuration information for each acquired node.

13 Claims, 22 Drawing Sheets

FIG.6

| NODE IDENTIFIER | CPU ARCHITECTURE | UUID | I/O DEVICE | | | | VOLUME | | | POWER SOURCE STATUS | SERVER MODEL | VIRTUAL LAYER | VIRTUALIZATION TYPE |
|---|---|---|---|---|---|---|---|---|---|---|---|---|---|
| | | | DEVICE | QUANTITY | WWN | DRIVER TYPE | I/F | CAPACITY | TYPE | | | | |
| NODE 1 | IA32 | UUID1 | HBA | 2 | WWN1 | H-Driver1 | IDE | 80GB | boot | ON | COMPANY A BLADE SERVER MODEL z | PHYSICAL | COMPANY A VIRTUALIZATION FACILITY a |
| | | | | | WWN2 | H-Driver1 | | | | | | | |
| | | | NIC | 2 | MAC1 | N-Driver1 | | | | | | | |
| | | | | | MAC2 | N-Driver1 | | | | | | | |
| NODE 2 | ... | UUID2 | HBA | 0 | ... | ... | ... | ... | ... | ON | ... | VIRTUALIZATION FACILITY | COMPANY A VIRTUALIZATION FACILITY a |
| | | | NIC | 0 | | | | | | | | | |
| NODE 3 | IA32 | UUID3 | HBA | 2 | WWN3 | H-Driver2 | SCSI | 80GB | boot | ON | COMPANY A BLADE SERVER MODEL z | VIRTUAL SERVER | COMPANY A VIRTUALIZATION FACILITY a |
| | | | | | WWN4 | H-Driver2 | SCSI | 80GB | data | | | | |
| | | | NIC | 2 | MAC3 | N-Driver2 | ... | ... | ... | | | | |
| | | | | | MAC4 | N-Driver2 | | | | | | | |
| NODE 4 | IA32 | UUID4 | HBA | 1 | WWN5 | H-Driver3 | SCSI | 80GB | boot | ON | COMPANY A BLADE SERVER MODEL z | VIRTUAL SERVER | COMPANY A VIRTUALIZATION FACILITY a |
| | | | NIC | 1 | MAC5 | N-Driver3 | ... | ... | ... | | | | |
| NODE 5 | IA64 | UUID5 | HBA | 1 | WWN6 | H-Driver3 | SCSI | 80GB | boot | ON | COMPANY A BLADE SERVER MODEL z | VIRTUAL SERVER | COMPANY A VIRTUALIZATION FACILITY a |
| | | | NIC | 1 | MAC6 | N-Driver3 | ... | ... | ... | | | | |
| NODE 6 | IA32 | UUID6 | HBA | 1 | WWN7 | H-Driver4 | SCSI | 80GB | boot | ON | COMPANY B BLADE SERVER MODEL x | PHYSICAL | ... |
| | | | NIC | 1 | MAC7 | N-Driver4 | ... | ... | ... | | | | |
| NODE 7 | IA32 | UUID7 | HBA | 1 | WWN7 | H-Driver4 | SCSI | 80GB | boot | ON | COMPANY B BLADE SERVER MODEL x | PHYSICAL | COMPANY C VIRTUALIZATION FACILITY c |
| | | | NIC | 1 | MAC7 | N-Driver4 | ... | ... | ... | | | | |
| NODE 8 | IA32 | UUID8 | HBA | 0 | ... | ... | ... | ... | ... | ON | ... | VIRTUALIZATION FACILITY | COMPANY C VIRTUALIZATION FACILITY c |
| | | | NIC | 0 | | | | | | | | | |
| NODE 9 | IA32 | UUID9 | HBA | 1 | WWN8 | H-Driver5 | SCSI | 80GB | boot | ON | COMPANY B BLADE SERVER MODEL x | VIRTUAL SERVER | COMPANY C VIRTUALIZATION FACILITY c |
| | | | NIC | 1 | MAC8 | N-Driver5 | ... | ... | ... | | | | |
| ... | ... | ... | ... | ... | ... | ... | ... | ... | ... | ... | ... | ... | ... |

FIG.7

| | 47A | 47B | 47C | 47D | 47E | 47F | 47G | 47H | 47I | 47J | 47K |
|---|---|---|---|---|---|---|---|---|---|---|---|
| | NODE IDENTIFIER | SERVICE IDENTIFIER | DISK IMAGE NAME | OS TYPE | ARCHITEC-TURE | HOST NAME | ID/OS PASSWORD | IP INFORMATION | P.P. NAME | P.P. SPECIFIC SETTING | MANAGEMENT MEANS |
| | NODE 1 | ... | ... | ... | IA32 | ... | ... | IP001 | ... | | STANDARDIZED INTERFACE |
| | NODE 2 | ... | ... | ... | ... | ... | ... | IP011 | ... | | WBEM RSH, RCP |
| | NODE 3 | SERVICE A-1 | DISK IMAGE 11 | Win 2003 | IA32 | Host11 | id11 password11 | IP111 IP112 | APPLICATION A | LOGICAL IP ADDRESS PORT NUMBER | PROGRAM 1 |
| | NODE 4 | SERVICE A-2 | DISK IMAGE 21 | Win 2003 | IA32 | Host21 | id21 password21 | IP211 | APPLICATION A | LOGICAL IP ADDRESS PORT NUMBER | PROGRAM 2 |
| | NODE 5 | SERVICE B-1 | DISK IMAGE 31 | Linux 2.6.2 | IA64 | Host31 | id31 password31 | IP311 | APPLICATION B | NON-CLUSTER SYSTEM PORT NUMBER | PROGRAM 2 |
| | NODE 6 | SERVICE A-1 | DISK IMAGE 41 | Win 2003 | IA32 | Host41 | id41 password41 | IP411 IP412 | APPLICATION A | LOGICAL IP ADDRESS PORT NUMBER | STANDARDIZED INTERFACE |
| | NODE 7 | ... | ... | ... | IA32 | ... | ... | IP501 | ... | | STANDARDIZED INTERFACE |
| | NODE 8 | ... | ... | ... | ... | ... | ... | IP511 | ... | | WMI SSH |
| | NODE 9 | SERVICE A-1 | DISK IMAGE 61 | Win 2003 | IA32 | Host61 | id61 password61 | IP611 IP612 | APPLICATION C | LOGICAL IP ADDRESS PORT NUMBER | PROGRAM 3 |
| | NODE 10 | ... | ... | ... | ... | ... | root password | IP711 | ... | | SVP SSH |
| | ... | ... | ... | ... | ... | ... | ... | ... | ... | ... | ... |

| PHYSICAL SERVER (NODE IDENTIFIER) 48A | VIRTUALIZATION FACILITY (NODE IDENTIFIER) 48B | VIRTUAL SERVER (NODE IDENTIFIER) 48C |
|---|---|---|
| NODE 1 | NODE 2 | NODE 3 |
| | | NODE 4 |
| | | NODE 5 |
| NODE 6 | ... | ... |
| NODE 7 | NODE 8 | NODE 9 |
| ⋮ | ⋮ | ⋮ |

| VIRTUALIZATION FACILITY IDENTIFIER | VIRTUALIZATION FACILITY TYPE (PRODUCT NAME) | IDENTIFICATION | | | PROGRAM INSTALLATION POSSIBILITY | | |
|---|---|---|---|---|---|---|---|
| | | INFORMATION ACQUISITION SOURCE | METHOD | PROTOCOL | PHYSICAL SERVER | VIRTUALIZATION FACILITY | VIRTUAL SERVER |
| VIRTUALIZATION FACILITY 1 | COMPANY A VIRTUALIZATION FACILITY a | VIRTUALIZATION FACILITY MANAGEMENT INTERFACE | JUDGE FROM VIRTUAL LAYER AND VIRTUALIZATION TYPE | WBEM, RSH, RCP | | ... | |
| VIRTUALIZATION FACILITY 2 | COMPANY B VIRTUALIZATION FACILITY b | ANY OF VIRTUAL SERVERS | VIRTUALIZATION FACILITY TYPE AND UUID CORRESPONDING TO VIRTUAL SERVER | UNIQUE MODEL SSH | IMPOSSIBLE | IMPOSSIBLE | POSSIBLE |
| VIRTUALIZATION FACILITY 3 | COMPANY C VIRTUALIZATION FACILITY c | SERVICE PROCESSOR | JUDGE FROM VIRTUAL LAYER AND VIRTUALIZATION TYPE | WMI SSH | POSSIBLE FOR ONLY COMPANY A SERVER | IMPOSSIBLE | POSSIBLE |
| ... | ... | ... | ... | ... | ... | ... | ... |

FIG.10

| RULE IDENTIFIER (50A) | RULE PARAMETER (50B) | PARAMETER FIXED VALUE (50C) | PARAMETER RANGE (50D) | EXCEPTION PARAMETER (50E) | PROBE METHOD (50F) |
|---|---|---|---|---|---|
| RULE 1 | IP ADDRESS | ... | 192.168.0.0~192.168.255.255, 192.168.200.10 | 192.168.0.0~192.168.0.2 192.168.100.1 | ping |
| RULE 2 | HOST NAME | hostname | 0001~1000 | 0500~0550 | SSH COMBINATION OF RULE 3 AND RULE 4 |
| RULE 3 | ID | ... | root, usr1, usr2, usr3 | ... | SSH COMBINATION OF RULE 2 AND RULE 4 |
| RULE 4 | PASSWORD | password | root, usr1, usr2, usr3 | ... | SSH COMBINATION OF RULE 2 AND RULE 3 |
| RULE 5 | HARDWARE VENDOR | COMPANY A | ... | ... | CIM |
| RULE 6 | OS | Linux 2.6. | 2.6.10~2.6.12 | ... | CIM |
| RULE 7 | MIDDLE WARE | Cosminexus | Ver.7.1~Ver.7.8 | Ver.7.5 | telnet COMBINATION OF RULE 3 AND RULE 4 |
| RULE 8 | MANAGEMENT I/F | SMASH | ... | ... | SMACH CLP |
| RULE 9 | AGENT PROGRAM | AgentProgram | Ver.1.2 | ... | Agent Program PROPRIETARY COMMUNICATION |
| RULE 10 | VIRTUALIZATION FACILITY | COMPANY A VIRTUALIZATION FACILITY a | Ver.1.0 | ... | COMMUNICATION DESCRIBED IN VIRTUALIZATION FACILITY MANAGEMENT TABLE |
| RULE 11 | IP ADDRESS FOR SERVICE PROCESSOR | ... | 200.100.0.1~200.100.0.20, 200.100.1.1~200.100.1.10 | ... | SSH COMBINATION OF RULE 3 AND RULE 4 |
| ⋮ | ⋮ | ⋮ | ⋮ | ⋮ | ⋮ |

FIG.11

| PROGRAM IDENTIFIER | DEPLOYMENT DESTINATION SERVER TYPE | DEPLOYMENT DESTINATION PLATFORM TYPE | LICENSE | | | MANAGEMENT LEVEL |
| --- | --- | --- | --- | --- | --- | --- |
| | | | USED QUANTITY | REMAINING QUANTITY | EXPIRATION DATE | |
| PROGRAM 1 | COMPANY A BLADE SERVER MODEL z1 | Linux2.6 IA32 | 0 | 10 | 28/Jan 2009 | LOOSE |
| PROGRAM 2 | COMPANY A BLADE SERVER MODEL z1 | Linux2.6 IA32 | 2 | 8 | 29/Feb 2009 | CLOSE |
| PROGRAM 3 | COMPANY A BLADE SERVER MODEL z1 | Win2003 IA32 | 3 | 7 | 28/Jan 2009 | LOOSE |
| PROGRAM 4 | COMPANY A BLADE SERVER MODEL z1 | Win2003 IA64 | 20 | 0 | 28/Jan 2009 | CLOSE |
| PROGRAM 5 | COMPANY B BLADE SERVER MODEL x1 | Linux2.6 IA32 | 5 | 5 | 1/Apr 2010 | LOOSE |
| PROGRAM 6 | COMPANY B BLADE SERVER MODEL x1 | Solaris10 IA32 | 0 | 10 | 1/Apr 2010 | LOOSE |
| PROGRAM 7 | COMPANY C VIRTUALIZATION FACILITY MODEL c | Win2003 IA32 | 1 | 9 | 31/Aug 2009 | CLOSE |
| PROGRAM 8 | COMPANY C VIRTUALIZATION FACILITY MODEL c | Linux2.6 IA32 | 5 | 5 | 31/Aug 2009 | CLOSE |
| ... | ... | ... | ... | ... | ... | ... |

FIG.20

| SERVICE PROCESSOR (NODE IDENTIFIER) 67A | PHYSICAL SERVER (NODE IDENTIFIER) 67B | VIRTUALIZATION FACILITY (NODE IDENTIFIER) 67C | VIRTUAL SERVER (NODE IDENTIFIER) 67D |
|---|---|---|---|
| ... | NODE 1 | NODE 2 | NODE 3 |
| NODE 10 | NODE 6 | ... | NODE 4 |
| ... | NODE 7 | NODE 8 | NODE 5 |
|  | ... | ... | NODE 9 |
|  |  |  | ... |

67

PROGRAM DEPLOYMENT APPARATUS AND METHOD

CROSS-REFERENCES TO RELATED APPLICATIONS

This is a continuation application of U.S. application Ser. No. 12/191,767, filed Aug. 14, 2008, now allowed, the contents of which are hereby incorporated by reference into this application.

This application relates to and claims priority from Japanese Patent Application No. 2008-130677, filed on May 19, 2008, the entire disclosure of which is incorporated herein by reference.

BACKGROUND

1. Field of the Invention

The invention relates to a program deployment apparatus and method and is suited for use in, for example, a management server for managing physical servers and virtual servers set on the physical servers (hereinafter referred to as "virtual servers"), in a server system.

2. Description of Related Art

Conventionally, various servers and server virtualization products exist at data centers. Various methods for managing those servers and server virtualization products have been suggested. As one example of such a management method, a method of deploying a server management program called an "agent program" to physical servers and virtual servers provided on the physical servers, both of which are targets to be managed, and installing the program on the physical servers and the virtual servers has been widely employed.

When deploying the agent program to the physical servers and the virtual servers in the above-described case, a system administrator has to assume a large burden of, for example, judging whether or not the platform for the physical servers and virtual servers is of the type to which the agent program can be deployed, and also judging which agent program from among the different kinds should be deployed.

As a means for solving the above-described problem, a technique of selectively installing an appropriate program to a remote client existing on a network and a technique of installing desired software on computers of different models have been suggested (Japan Patent Laid-Open (Kokai) Application Publication No. 2007-58664 and Japan Patent Laid-Open (Kokai) Application Publication No. 2000-276332).

Users of servers installed at data centers wish to minimize the use of memory resources for server management in consideration of costs and other factors. If virtual servers are active on physical servers, some users accept installing a management program on virtual servers used directly for their services, but avoid installing such programs on physical servers not used directly for the services. Therefore, an operation for server management to deploy the program only to the virtual servers and not to the physical servers is required in the above-described case.

However, the techniques disclosed in Japan Patent Laid-Open (Kokai) Application Publication No. 2007-58664 and Japan Patent Laid-Open (Kokai) Application Publication No. 2000-276332 are based on the premise that a program is deployed to all the remote clients and computers existing on a network. So, the conventional art has a problem of being unable to selectively deploy a program, as described above.

SUMMARY

The present invention was devised in light of the circumstances described above. It is an object of the invention to provide a program deployment apparatus and method capable of selective program deployment.

In order to achieve the above-described object, the present invention has a feature whereby, a program deployment apparatus that is connected via a network to at least one physical server including a physical server with a virtualization facility for providing a virtual server to a client, and deploys a program to the at least one physical server as necessary includes: a detection unit for detecting one or more nodes which are any of the physical server, the virtualization facility, and the virtual server and connected via the network; an acquisition unit for acquiring, for each node detected by the detection unit, first configuration information about a virtual layer of the node; and a deployment unit for selectively deploying the program to the relevant node based on the first configuration information for each node which is acquired by the acquisition unit.

The invention also has a feature whereby, a program deployment method for an apparatus connected via a network to at least one physical server including a physical server with a virtualization facility for providing a virtual server to a client, for deploying a program to the at least one physical server as necessary includes: a first step of detecting one or more nodes which are any of the physical server, the virtualization facility, and the virtual server and connected via the network; a second step of acquiring, for each detected node, first configuration information about a virtual layer of the node; and a third step of selectively deploying the program to the corresponding node based on the first configuration information for each node acquired.

This invention enables selective program deployment. As a result, the operation for server management can be performed, for example, to deploy a program to virtual servers and physical servers with inactive virtualization facilities, and not deploy the program to equipment incompatible with the program or physical servers with active virtualization facilities. Consequently, a highly convenient program deployment apparatus and method can be realized.

Other aspects and advantages of the invention will be apparent from the following description and the appended claims.

BRIEF DESCRIPTION OF THE DRAWINGS

FIG. 6 shows a server management table.

FIG. 7 shows a server logical information management table.

FIG. 8 shows a server model information management table.

FIG. 9 shows a virtualization facility management table.

FIG. 10 shows a data center operation policy management table.

FIG. 11 shows a program management table.

FIG. 20 shows a server model information management table according to the second embodiment.

DETAILED DESCRIPTION OF PREFERRED EMBODIMENTS

Embodiments of the present invention will be explained below with reference to the attached drawings.

(1) First Embodiment

(1-1) Configuration of Server System According to First Embodiment

Figure 1:
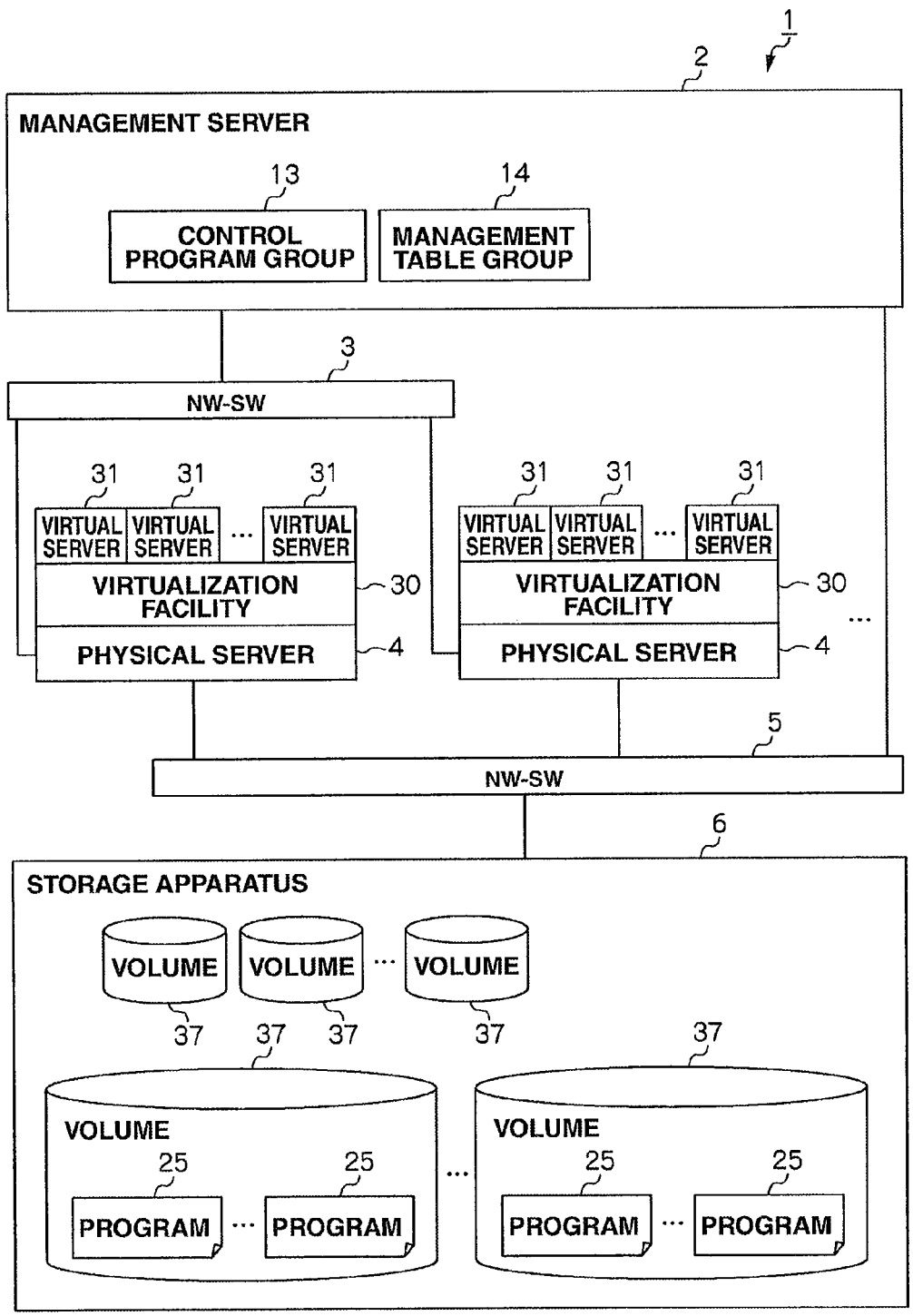
FIG. 1 is a block diagram showing the schematic configuration of a server system according to the first embodiment of the present invention.

In FIG. 1, reference numeral "1" represents, as a whole, a server system installed at a data center according to this embodiment. This server system 1 is configured so that a management server 2 is connected via a first network switch (NW-SW) 3 to one or more physical servers 4, and the management server 2 and the physical server(s) 4 are respectively connected via a second network switch (NW-SW) 5 to a storage apparatus 6.

Figure 2:
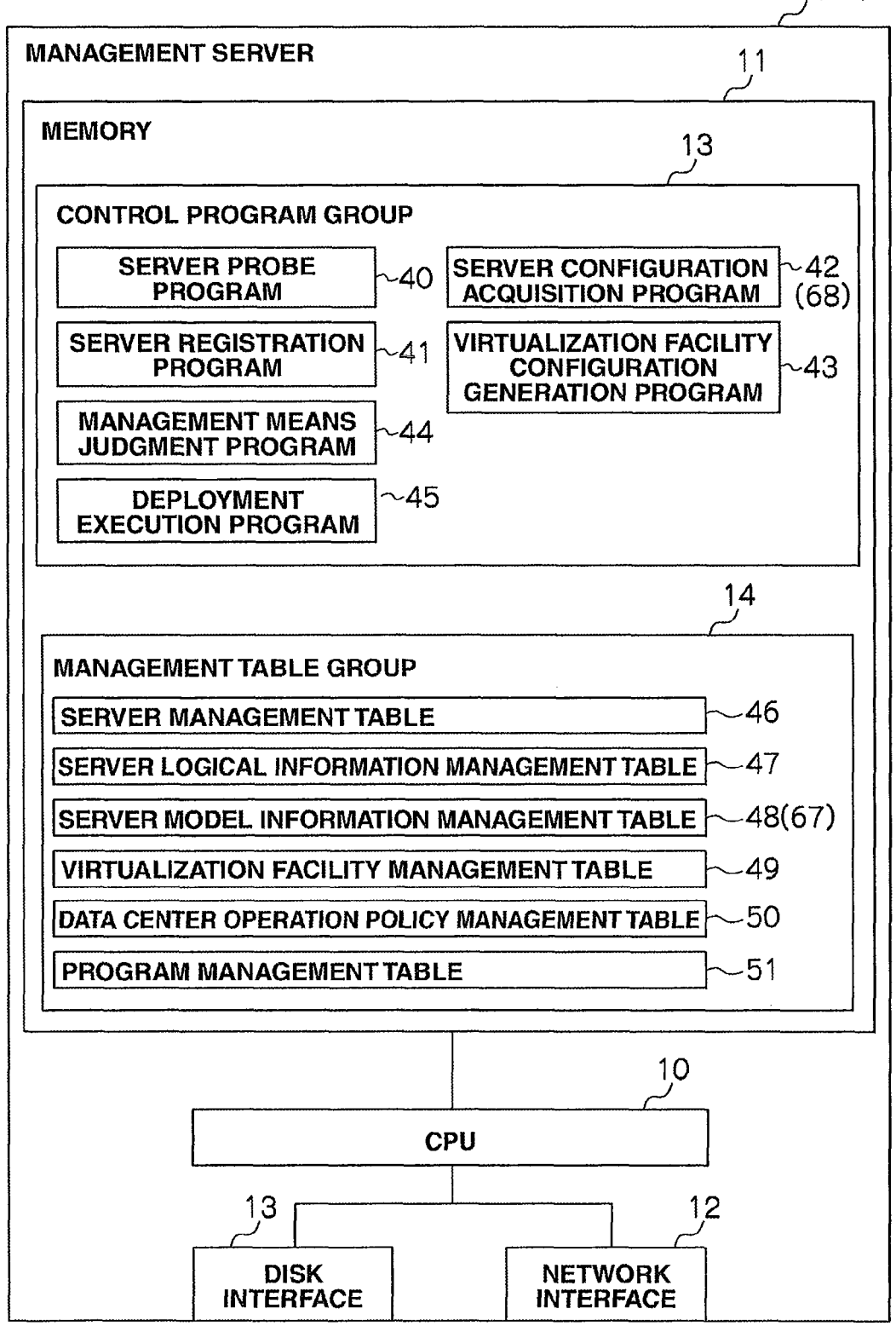
FIG. 2 is a block diagram showing the schematic configuration of a management server.

The management server 2 is composed of, for example, a personal computer or a workstation and includes a CPU (Central Processing Unit) 10, memory 11, a network interface 12, and a disk interface 13 as shown in FIG. 2.

The CPU 10 is a processor for controlling the operation of the entire management server 2 and executes necessary processing based on a control program group 13 and management table group 14 (described later) stored in the memory 11. The memory 11 is used to store the control program group 13 and management table group 14 (described later) and also serves as work memory for the CPU 10.

The network interface 12 is a communication interface compatible with the first network switch 3 (FIG. 1) and performs protocol control when the management server 2 communicates with each physical server 4. The disk interface 13 is a communication interface compatible with the second network switch 5 and performs protocol control when the management server 2 communicates with the storage apparatus 6.

Figure 3:
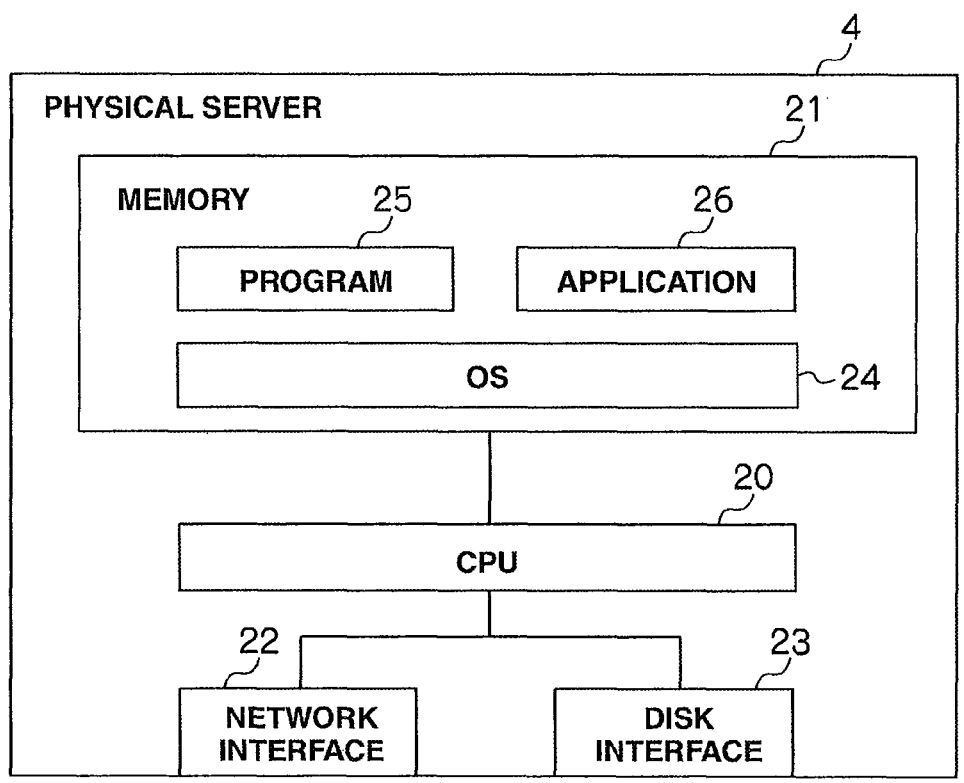
FIG. 3 is a block diagram showing the schematic configuration of a physical server.

Each physical server 4 is composed of, for example, a personal computer or a workstation like the management server 2 and includes a CPU 20, memory 21, a network interface 22, and a disk interface 23 as shown in FIG. 3. Since the CPU 20, the memory 21, the network interface 22, and the disk interface 23 have functions respectively similar to those of the CPU 10, the memory 11, the network interface 12, and the disk interface 13 for the management server 2, a description of the details of those components of the physical server 4 has been omitted.

The physical server 4 has an OS (Operating System) 24 installed for device management within the physical server 4, and the OS 24 is active in the physical server 4. Incidentally, when the OS 24 for the physical servers 4 is not active, the OS 24 can be activated by turning power on via a WOL (Wake up On Lan) or a BMC (Basement Management Controller).

The OS 24 is equipped with, for example, a management program 25 and a service-providing application 26, and the program 25 and application 26 operate on the OS 24. The program 25 is a program dedicated to managing the physical servers 4 and the virtual servers 31. The program enables acquisition of asset, performance, and fault information about the OS 24 and the physical servers 4. Also, the program 25 can start or terminate other programs and enter a termination command to the OS 24 itself. Furthermore, the program 25 can manage the operation of the application 26 by providing the program 25 with a function for monitoring the application 26.

Figure 4:
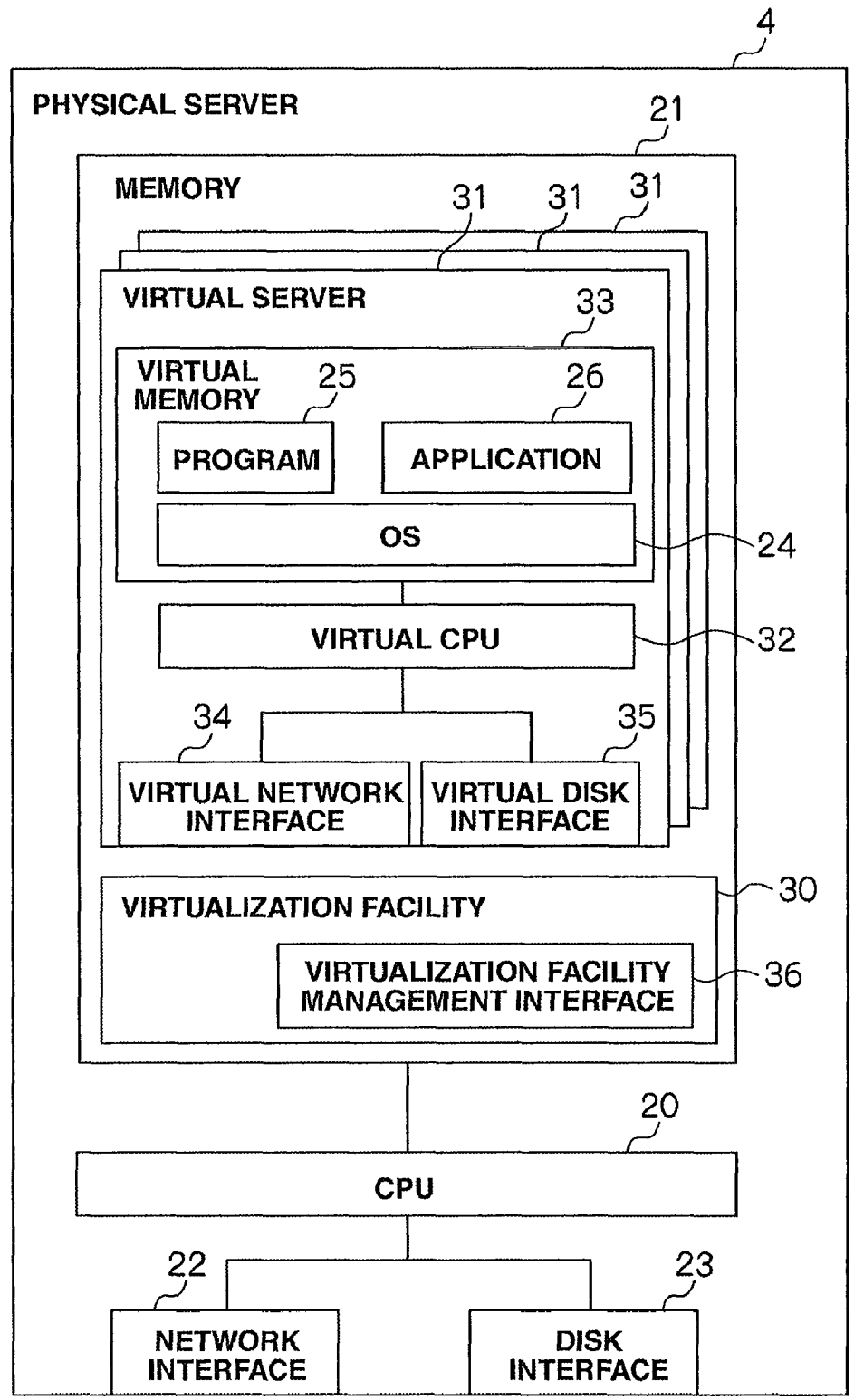
FIG. 4 is a block diagram showing the schematic configuration of a physical server, a virtualization facility, and virtual servers.

As shown in FIG. 4, a virtualization facility 30, which is one of control programs stored in the memory 21, operates on each physical server 4. This virtualization facility 30 creates virtual servers 31, each composed of, for example, a virtual CPU 32, virtual memory 33, a virtual network interface 34, and a virtual disk interface 35, all of which are virtual versions of devices such as the CPU 20, the memory 21, the network interface 22, and the disk interface 23 for the physical server 4.

The virtual memory 31 for each virtual server 31 stores its program 25, application 26, and OS 24 separately from those for other virtual servers 31. The individual virtual server 31 is designed to provide services similar to those of the physical servers 30 in accordance with the program 25, the application 26, and the OS 24.

The virtualization facility 30 and each virtual server 31 are also connected to the management server 2 via a virtualization facility management interface 36 for the virtualization facility 30. The management server 2 can collect and set information about the virtualization facilities 30 and each virtual server 31 via the virtualization facility management interface 36 and also control a power source for each virtual server 31.

The storage apparatus 6 (FIG. 1) includes a plurality of disk devices (not shown in the drawing) operated according to, for example, a RAID (Redundant Array of Inexpensive Disks) system. As shown in FIG. 1, a plurality of volumes 37 is defined in storage areas provided by the plurality of disk devices. Incidentally, examples of attributes of these volumes 37 include system volumes and data volumes. The system volumes are used to store system information about the OS and the like, and the data volumes are used to store user data.

One or more volumes 37 connected to the management server 2 also exist in the storage apparatus 6, and these volumes 37 store and retain one or more kinds of programs 25 to be deployed to the physical servers 4 and the virtual servers 31, as described later.

(1-2) Program Deployment Method in Server System

(1-2-1) Outline of Program Deployment Method

In the server system 1 according to the first embodiment described above, the management server 2 deploys a management program 25 to newly introduced physical servers 4 and virtual servers 31 for the purpose of managing the physical servers 4 and the virtual servers 31, and then manages the physical servers 4 and the virtual servers 31 using the program 25. Also, the management server 2 manages the virtualization facilities 30 by a management method without using the management program 25 (for example, a management method using an OS standard interface or other standardized interface).

However, such a program 25 sometimes cannot be deployed to the physical servers 4 or the virtual servers 31 because of a server user's request or a compatibility problem between the program 25 and the servers.

One of features of the server system 1 is that the server system 1 judges whether or not newly introduced physical servers 4 or virtual servers 31 are servers to which the management program 25 can be deployed; and the server system 1 then selectively deploys the program 25 to the physical servers 4 and virtual servers 31 to which the program 25 can be deployed.

Figure 5:
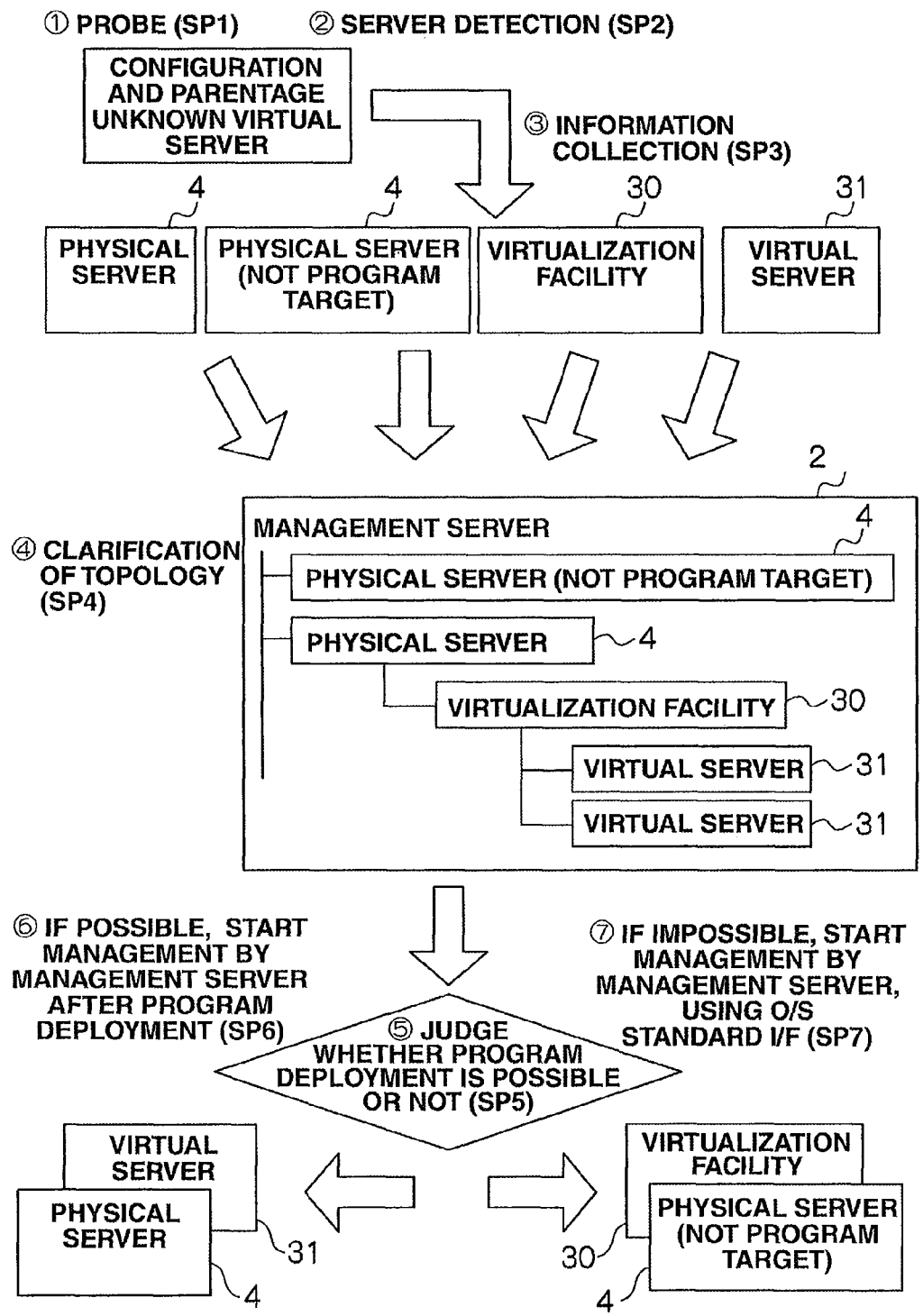
FIG. 5 is a conceptual diagram explaining the outline of program deployment processing according to the first embodiment.

FIG. 5 shows the outline of a management program deployment method according to this embodiment. Periodically or upon the occurrence of a specified event, the management server 2 in the server system 1 according to this embodiment probes nodes (which are physical nodes 4, virtualization facilities 30, and virtual servers 31 as shown in FIG. 5) (SP1) connected to the first network switch 3 and searches the nodes connected to the first network switch 3 (SP1).

If the management server 2 detects nodes newly connected to the first network switch 3 (hereinafter referred to as "new nodes") as a result of probing (SP2), it collects information about the new nodes (SP3). In order to collect this information, methods using an information collection program or using the OS standard interface or standardized protocol can be utilized.

The detailed information can be collected by performing information collection in accordance with the operation policy of the relevant data center. An example of the operation policy of the data center is definition of the range of IP addresses given to the physical servers 4, the virtualization facilities 30, and the virtual servers 31. If this operation policy is followed when detecting the new nodes by means of, for example, "pinging," good efficiency with respect to time can be achieved and an extra load on the network due to unnecessary packets can be prevented. Also, when collecting information, a naming convention for a host name and user ID and password generation rules (described later) are useful. Using this convention and rules makes it possible to establish connection to the servers and collect the information. If the operation designating a connection method is employed, the designated connection method can be defined as the operation policy, thereby enabling collection of the information with more certainty and efficiency.

Subsequently, the management server 2 judges the type of each node—whether it is a physical server 4, a virtualization facilities 30, or a virtual server 31—based on the information collected in step SP3; and clarifies the lineage between these new nodes (the topology between the newly-found physical servers 4, virtualization facilities 30, and virtual servers 31) (SP4). By clarifying this lineage, the operation for, for example, not deploying the program 25 to the physical servers 4 on which the virtual servers 31 are active, or to the virtualization facilities 30 can be performed.

Next, the management server 2 judges whether or not the program 25 can be deployed to the new nodes detected in step SP2 (SP5). This means that the method for managing the new nodes is decided.

If an affirmative judgment is returned in SP5, the management server 2 deploys the program 25 to the new nodes and then starts managing the new nodes, using the program 25 (SP6). The targets to be managed are the physical servers 4 and the virtual servers 31. The program 25 may not be deployed to the physical servers 4, depending on the operation policy of the data center. In this embodiment, the program 25 is not deployed to the physical servers 4 on which the virtual servers 31 are active. On the other hand, the program 25 is deployed to the physical servers 4 if the virtualization facilities 30 are not active on the physical servers 4, or if the virtualization facilities 30 employ a commonly-used host OS. Once the program 25 is deployed to the physical servers 4 and/or the virtual servers 31, information collection relating to, and monitoring, setting, and control of, the physical servers 4 and the virtual servers 31 will be performed via the program 25.

If a negative judgment is returned in SP5, the management server 2 does not deploy the program 25 to the new nodes and then starts managing the new nodes, using, for example, the OS standard interface or a standardized interface (SP7). The targets to be managed are the virtualization facilities 30 and the physical servers 502 incompatible with the program 25. In this way, it is possible to prevent deployment of the server management program 25 to the virtualization facilities 30.

(1-2-2) Configuration of Various Programs and Various Tables

As a means for realizing the program deployment method according to the first embodiment described above, the memory 11 for the management server 2 stores, as shown in FIG. 2: a program group 13 consisting of a server probe program 40, a server registration program 41, a server configuration acquisition program 42, a virtualization facility configuration generation program 43, a management means judgment program 44, and a deployment execution program 45; and a management table group 14 consisting of a server management table 46, a server logical information management table 47, a server model information management table 48, a virtualization facility management table 49, a data center operation policy management table 50, and a program management table 51.

Of the above-listed programs, the server probe program 40 is a program for probing the nodes (physical servers 4, virtualization facilities 30, and virtual servers 31) connected via the first network switch 3 (FIG. 1) to the management server 2, and the server registration program 41 is a program for registering the new nodes detected as a result of probing, with the server management table 46.

The server configuration acquisition program 42 is a program for acquiring configuration information about each node registered with the server management table 46 by the server registration program 41, and the virtualization facility configuration generation program 43 is a program for detecting the topology between the new nodes.

The management means judgment program 44 is a program for judging whether or not the program 25 should be deployed to the new nodes registered with the server management table 46, and the deployment execution program 45 is a program for deploying the program 25 to the new nodes for which the judgment is made to deploy the program 25.

Incidentally, the following explanation will be given assuming that agents executing various kinds of processing are the server probe program 40, the server registration program 41, the server configuration acquisition program 42, the virtualization facility configuration generation program 43, the management means judgment program 44, or the deployment execution program 45; however, needless to say, the CPU 10 for the management server 2 actually executes processing based on the relevant programs.

Meanwhile, the server management table 46 is a table used by the management server 2 to manage nodes connected to the management server 2, and is composed of a "node identifier" field 46A, a "CPU architecture" field 46B, an "UUID" field 46C, an "I/O device" field 46D, a "volume" field 46E, a "power source status" field 46F, a "server model" field 46G, a "virtual layer" field 46H, and a "virtualization type" field 46I.

The "node identifier" field 46A stores an identifier given to each node (physical server 4, virtualization facility 30, or virtual server 31) connected to the management server 2 and detected by the server probe program 40 (hereinafter referred to as the "node identifier"). The "CPU architecture" field 46B stores the architecture of the CPU mounted on the relevant node. The CPU architecture is information required when selecting the type of the program 25. If the program 25 is of the type prepared for CPU architecture different from that of the node to which the program 25 has been deployed, there is a high possibility that the program 25 may operate, but fail to fulfill its role sufficiently.

The "UUID" field 46C stores an UUID (Universal Unique Identifier) given to the relevant node. The UUID is an identifier whose format is originally defined so that there will be no redundant identifiers globally, and whose uniqueness can be guaranteed with certainty. Therefore, the UUID is an candidate for the node identifier to be stored in the "node identifier" field 46A and is very effective for a wide range of server management. However, a node identifier requested by a system administrator may be used as the node identifier to be stored in the "node identifier" field 46A. In fact, there would be no problem if redundant node identifiers are not used for different nodes. So, although it is desirable to use the UUID, it is not always necessary to do so. For example, a host name, an IP address, a MAC (Media Access Control) address, and a WWN (World Wide Name) can be used for the node identifier.

The "I/O device" field 46D is composed of a "device" field 46J, a "quantity" field 46K, a "WWN" field 46L, and a "driver type" field 46M. The "device" field 46J stores the device type of an I/O (Input/Output) device(s) used by the relevant node for communication with the management server 2. Examples of the device type include an HBA (Host Bus Adaptor) and an NIC (Network Interface Card).

The "quantity" field 46K stores the number of the I/O devices. If the number of I/O devices is small, since it is desirable for the load placed by the program 25 on the network or similar to be lighter, it is necessary to select a program 25 with a light load as the program 25 to be deployed to the relevant node. If the relevant node has a plurality of I/O devices, one or more I/O devices may be monitored. In this case, a program 25 capable of maintaining close cooperation between the management server 2 and the relevant node needs to be selected as the program 25 to be deployed to the relevant node.

The "WWN" field 46K stores a network address (such as a "WWN" for an HBA or an "MAC address" for an NIC) given to the I/O device(s) whose device type is stored in the corresponding "device" field 46J. The network address serves as an identifier for identifying the relevant node in a SAN (Storage Area Network) environment. Therefore, the network address sometimes serves as a node identifier in a system configured for a SAN environment. Since the MAC address is generally a unique identifier, it may sometimes assume the role of a node identifier.

The "driver type" field 46M stores the device driver type of the relevant I/O device(s). In order to avoid the system from going down due to incompatibility between the devices, it is important to know what kind of device drivers are incorporated in the system.

The "volume" field 46E is composed of an "interface" field 46N, a "capacity" field 46P, and a "type" field 46Q. The "interface" field 46N stores the type of interface (such as IDE [Integrated Device Environment] or SCSI [Small Computer System Interface]) used by the relevant node when inputting/outputting data to/from volumes 37 (FIG. 1) connected to the node.

The "capacity" field 46P stores the capacity of the volumes 37. If the total capacity of the volumes 37 is small, consuming a large amount of database area for the program 25 is unacceptable, so the operation with lightest possible load is preferred. On the other hand, if the total capacity of the volumes 37 is large and a large number of nodes need to be managed, it would be better to create a database, which would make it possible to construct a highly-reliable system in terms of information search and accumulation.

Furthermore, the "type" field 46Q stores information indicating the attribute of the relevant volume 37, whether it is a system volume ("boot") or a data volume ("data"). The initial setting value for the "type" field 46Q may be set to the former attribute ("boot") and kept unchanged; however, generally, a system administrator sets the attribute of the volume(s) 37 in the "type" field 46Q. Input to the "node identifier" field 46A may be omitted by designating information stored in any of the fields in this server management table 46 or a combination of pieces of information stored in a plurality of fields in the server management table 46. Alternatively, the node identifiers may be automatically assigned, for example, in ascending order.

The "power source status" field 46F stores the power source status of the relevant node. There are two kinds of power source status: active state ("on") and inactive state ("off"). If the power source for a node is off when deploying the program 25 to the node, it is necessary to turn power on; and therefore, the management server 2 manages the power source status of each node. Information cannot be collected about the virtual servers 31 if their power is off; however, when storing values in the server model information management table 48 (described later) (see FIG. 8), it is necessary to fill In all the necessary information in that table 28 properly. As a result, the virtualization facilities 30 and the virtual servers 31 can operate and false deployment of the program 25 to the defined physical servers 4 can be avoided.

The "server model" field 46G stores the server model (such as a vendor name and a model name) of the relevant node. This information is used to judge whether or not the relevant node can be managed, using the program 25.

The "virtual layer" field 46H stores a virtual layer of the relevant node. There are three types of virtual layer: a "physical" layer, a "virtualization facility" layer, and a "virtual server" layer which respectively correspond to a physical server 4, a virtualization facility 30, and a virtual server 31. The management server 2 judges, based on the above information, the type of each node, whether it is a physical server 4, a virtualization facility 30, or a virtual server 31; and the management server 2 then determines the topology between the nodes.

The "virtualization type" field 46I stores the virtualization type (the name of a vendor providing the relevant virtualization product and the product name) of the relevant node. This information is necessary for acquisition of information indicating, for example, whether or not the relevant node is compatible with an information acquisition interface, protocol, and a CIM (Common Information Model). A virtualization facility identifier (described later) (see FIG. 9) has the same meaning.

This server management table 46 basically stores no information at the time of initialization. Every time the server probe program 40 (FIG. 2) detects a new node (physical server 4, virtualization facility 30, and/or virtual server 31), various kinds of information about the new node are collected and then necessary pieces of information from among the collected information are stored in the server management table 46.

Since the virtualization facilities 30 can be recognized by a user as if they do not use any device, there is a possibility that no information may be stored in the "CPU architecture" field 46B, the "quantity" field 46K, the "WWN" field 46L, the "driver type" field 46M, the "interface" field 46N, the "capacity" field 46P, or the "type" field 46Q (i.e., the corresponding information cannot be collected) as shown in entries for the node identifiers "node 2" and "node 3" in FIG. 6.

This depends on what form of virtualization facilities 30 the vendor providing server virtualization products intends to provide. If information is stored in the fields listed above, the information may be shared with physical devices. Consequently, it is possible to presume that a physical server 4 and a virtualization facility 30 having identical information may constitute a pair.

The server logical information management table 47 is a table for the management server 2 to manage the logical configuration of each node (physical server 4, virtualization facility 30, or virtual server 31) connected to the management server 2 itself, and is composed of, as shown in FIG. 7, a "node identifier" field 47A, a "service identifier" field 47B, a "disk image name" field 47C, an "OS type" field 47D, an "architecture" field 47E, a "host name" field 47F, an "ID/OS password" field 47G, an "IP information" field 47H, a "program name" field 47I, a "program specific setting" field 47J, and a "management means" field 47K.

The "node identifier" field 47A stores a node identifier given to the relevant node, and the "service identifier" field 47B stores a service identifier identifying a service for which the relevant node is used. Examples of a method for describing the service identifier include: a description method of specifying individual services at a server level by describing, for example, a first server and a second server for service A; a description method of indicating installation of common software for service A and specifying the service level; and a description method of indicating installation of common software for the system and specifying a common environment level. Incidentally, the service for which the relevant node is used is normally described by the system administrator, but can be deduced by the management server 2 from the installed hardware and programs.

There is also a case where the service can be specified at the stage when a packaged program is found based on the operation policy of the data center. Using the specified service in a cooperative manner makes it possible to change the version of the program 25 to be deployed. As a result, the management level for the relevant node (as described later with reference to FIG. 11) is changed, and the operation can be performed so that a program 25 which will place a load on the physical servers 4 and the virtual servers 31, but can closely cooperate with the OS and hardware will be deployed, or conversely, a program 25 which will not place a load on the physical servers 4 or the virtual servers 31, but can only loosely cooperate with the OS or hardware will be deployed. Since different program functions are required for different services and applications, the management policy is used in different manners as required depending on the situation (policy management).

When receiving an OS activation notice, a fault notice, a hardware information notice (insertion or removal of a blade server), or a software update information notice (including updates) such as installation and uninstallation of programs, the management server 2 can update the server logical information management table 47 and then select and deploy the program 25.

The "disk image name" field 47C stores a disk image name for a volume 37 (FIG. 1) used by the relevant node. The disk image name is an identifier for specifying each disk image. This identifies the disk image of a physical server 4 or a virtual server 31 and can be considered to have almost the same meaning as a service. However, there are disk images on which applications are not installed, and disk images on which the OS and applications are installed, but not set up. Deploying such disk images makes it easier to improve the services or add the physical servers 4 or virtual servers 31 for providing the services. Using such information in a cooperative manner makes it possible to perform cooperative operation so that a program 25 for loose cooperation is deployed first and then, when the time comes for full provision of the service(s), a program 25 for close cooperation is redeployed.

While providing the various services, hardware-specific functions can be used to enhance the reliability of the system. On the other hand, the program 25 for loose cooperation may sometimes be redeployed. As a result, it is possible to utilize the program 25 as an information collecting tool required only when constructing the system. Also, a completely different program 25 may be redeployed depending on the intended use, thereby enabling flexible system construction and operation to eliminate resident programs as much as possible in accordance with the users' needs. In order to redeploy the program 25, a method of deploying the program 25 by means of RCP (Remote Copy) or RSH (Remote Shell) and executing an installer may be used, or deployment software may be used. A number of means for deploying the program 25 may be tried as deployment procedures, with the best method then being selected. It is also possible to delete the used program 25 from the node. Computer resources can be effectively utilized for the services by reducing resident programs as much as possible. A trigger for redeployment may be given by the user or by an alert notice from the node. Examples of the trigger include activation of the OS, insertion and removal of a blade server, and hardware and software fault notices, a predictive fault notice, performance failure notice, and predictive performance failure notice. Redeployment of a program 25 for close cooperation for acquisition of detailed information when detecting a fault or a predictive fault, and redeployment of a program 25 having a function of incorporating a system configuration into an HA (High Availability) configuration that places an emphasis on high availability can contribute to analysis of causes of the relevant fault, examination of how to deal with the fault, and the enhancement in the availability of the system.

The "OS type" field 47D stores the type of the OS used for the relevant node. Including information such as service packs and patches in the information to be stored in the "OS type" field 47D makes it possible to judge based on the above information whether the program 25 is compatible with the node or not, and to select the compatible program 25. From the viewpoint of security, the information in the "OS type" field 47D has the advantage of enabling easy maintenance of the relevant node. In this embodiment, the type of the OS used by the relevant node is described in the "OS type" field 47D, but the OS types other than those shown in FIG. 7 can also be stored in this "OS type" field 47D in the same manner.

The "architecture" field 47E stores a CPU architecture compatible with the OS for the relevant node. Like the OS type stored in the "OS type" field 47D, the CPU architecture stored in the "architecture" field 47E can be used as the basis for judgment of whether the individual program 25 is compatible with the node or not, and for selection of the compatible program 25. Incidentally, CPU architectures other than those shown in FIG. 7 may be stored in the "architecture" field 47E in the server logical information management table 47 in the same manner.

The "host name" field 47F stores the host name of a host (physical server 4 or virtual server 31) accessible to the relevant node. Establishing connection by limiting the host name can be tried according to the data center operation policy. As a result, the possibility of connection will be improved spectacularly and contributions will be made to promotion of efficiency and certainty in acquisition of information. The result of a successful connection (host name) is stored in the "host name" field 47F.

The "ID/OS password" field 47G stores a password for the OS used by the relevant node. Like the "host name" field 47F, this password is information necessary for collecting information and is based on information obtained according to the data center operation policy. The result of a successful connection is stored in the "ID/OS password" field 47G.

The "IP information" field 47H stores IP information, such as an IP address, a subnet mask, and a default gateway, about the relevant node. Probing can be performed by designating the range of the IP address according to the data center operation policy (as described later). The IP address may become an identifier for identifying the relevant node, depending on the system administrator or the application.

The "program name" field 47I stores the name of a middleware or application program that is packaged in the relevant node and is required for providing the relevant service, as well as version information about the program. Using the information stored in this "program name" field 47I in a cooperative manner makes it possible to change the version of the program 25 to be deployed. As a result, the management level for the relevant node is changed, and the management can be performed so that a program 25 which will place a load on the physical servers 4 and the virtual servers 31, but can closely cooperate with the OS and hardware will be deployed, or conversely, a program 25 which will not place a load on the physical servers 4 or the virtual servers 31, but can only loosely cooperate with the OS or hardware will be deployed. Since different program functions are required for different services and applications, the management policy is used in different manners as required depending on the situation (policy management).

The "program specific setting" field 47J stores the relevant node-specific information. Examples of the node-specific information are an IP address (logical IP address) or a port number used for the relevant program. If there are redundant port numbers, software may not be activated or, even if it is activated, it may not operate properly. Therefore, in order to avoid redundancy, values for the port numbers and similar used for each program need to be collected, thereby preventing any trouble. When deploying and installing the program 25, it is also possible to change the port to be used.

This information can be deduced by acquiring the port in use and the provided service, using the OS standard interface. If conditions for coexistence with other programs are decided according to the data center operation policy, whether or not the program 25 may be deployed can be judged. An example of the data center operation policy in this case is limitations on operating environments such as JRE (Java [registered trademark] Runtime Environment).

The "management means" field 47K stores a means for managing the relevant node. If the program 25 is used to manage the node, an identifier for the program 25 is stored in the "management means" field 47K. If the node is managed using the OS standard interface or another standardized interface, information such as a management model or communication protocol is stored in the "management means" field 47K. When information is being collected, no value is stored in the "management means" field 47K. The information will be stored later in the "management means" field 47K by the management means judgment program 44 for deciding the management means (FIG. 2).

This server logical information management table 47 basically stores no information at the time of initialization. Every time the server probe program 40 (FIG. 2) detects a new node (physical server 4, virtualization facility 30, and/or virtual server 31), various kinds of information about the new node is collected and then necessary pieces of information from among the collected information are stored in the server logical information management table 47.

Meanwhile, the server model information management table 48 is a table for managing the hierarchical configuration (server model) between nodes registered with the server management table 46 (FIG. 6), and is composed of a "physical server" field 48A, a "virtualization facility" field 48B, and a "virtual server" field 48C as shown in FIG. 8.

The "physical server" field 48A stores a node identifier for each physical server 4 from among the nodes managed by the management server 2, and the "virtualization facility" field 48B stores a node identifier for a virtualization facility 30 mounted on the relevant physical server 4 in association with the node identifier for that physical server 4. Incidentally, the "virtualization facility" field 48B may store a virtualization facility identifier described later with reference to FIG. 9. Furthermore, the "virtual server" field 48C stores node identifiers for virtual servers 31 that are set on the relevant virtualization facility 30 in association with the node identifier for that virtualization facility 30.

This server model information management table 48 basically stores no information at the time of initialization. Every time the server probe program 40 (FIG. 2) detects a new node, various kinds of information about the new node are collected and then the node identifiers are stored in the server model information management table 48 in association with each other.

This server model information management table 48 makes it possible to recognize the topology between the physical servers 4, the virtualization facilities 30, and the virtual servers 31. As a result, a judgment can be made, for example, to deploy the program 25 to the virtual servers 31 and not deploy the program 25 to the physical servers 4 and the virtualization facilities 30, or to deploy the program 25 to the physical servers 4 where no virtual server 31 exists.

When making the judgment as described above, it is important for the node identifiers for the virtual servers 31 whose power is off to be stored in the "virtual server" field 48C. If their node identifiers are not registered, the program 25 may be mistakenly deployed to the physical servers 4 to which the program 25 should not be deployed. Therefore, it is possible to avoid the occurrence of such a mistake by also considering the virtual servers 31 whose power is off.

Completion of this server model information management table 48 enables judgment of the management means for each node, so that values to be stored in the "management means" field 47K in the server logical information management table 47 described above with reference to FIG. 7 can be decided.

The virtualization facility management table 49 is a table created by the system administrator in order to manage access methods for different types of virtualization facilities 30 and whether programs can be installed or not. As shown in FIG. 9, the virtualization facility management table 49 is composed of a "virtualization facility identifier" field 49A, a "virtualization facility type" field 49B, an "identification" field 49C, and a "program installation possibility" field 49D.

The "virtualization facility identifier" field 49A stores an identifier given by the system administrator to each virtualization facility 30 (hereinafter referred to as the "virtualization facility identifier"), and the "virtualization facility type" field 49B stores product information about the relevant virtualization facility 30. Specifically speaking, the name of a vendor who manufactures and sells the virtualization facility 30, and the product name of the relevant virtualization facility 30 are stored in the "virtualization facility type" field 49B.

The "identification" field 49C is composed of an "information acquisition source" field 49E, a "method" field 49F, and a "protocol" field 49G. The "information acquisition source" field 49E stores an information acquisition source (information source) from which information to be stored in the server management table 46 (FIG. 6) and the server model information management table 48 (FIG. 8) described above is acquired. If the virtual server 31 or the virtualization facility management interface 36 (FIG. 4) is used to acquire information about the virtualization facility 30 and the virtual server 31 or to acquire an identifier (such as UUID) for the physical server 4 on which the virtualization facility 30 is active, the "information acquisition source" field 49E stores the node identifier for the relevant virtual server 31 or the identifier for the relevant virtualization facility management interface 36.

The "method" field 49F stores a method for identifying the relevant virtualization facility 30 and the physical server 4 on which that virtualization facility 30 operates. If information about the virtual layer and the virtualization type (see FIG. 6) is acquired and whether the relevant node is a virtualization facility 30 or not is judged based on the acquired information, the "method" field 49F stores information to that effect. If the type of the virtualization facility 30 corresponding to the virtual server 31 or identifiers (such as UUID) for the virtualization facility 30 and the physical server 4 are acquired from the virtual server 31 in order to identify the virtualization facility 30 and the physical server 4 on which the virtualization facility 30 operates, the "method" field 49F stores information to that effect.

The "protocol" field 49G stores a protocol for connection with the information acquisition source stored in the "information acquisition source" field 49E or a data model when collecting information. This operation policy enables information collection by specifying the information acquisition source and the method.

The "program installation possibility" field 49D is composed of a "physical server" field 49H, a "virtualization facility" field 49I, and a "virtual server" field 49J. The "physical server" field 49H stores information indicating whether or not the program 25 can be installed ("possible" or "impossible") on the physical server 4 on which the relevant virtualization facility 30 operates; and the "virtualization facility" field 49I stores information indicating whether or not the program 25 can be installed on the relevant virtualization facility 30. Furthermore, the "virtual server" field 49J stores whether or not the program 25 can be installed on the virtual server 41 that operates on that virtualization facility 30.

Incidentally, default values are prepared in advance as information to be stored in each of the "physical server" field 49H, the "virtualization facility" field 49I, and the "virtual server" field 49J. If no information is stored in the "physical server" field 49H, the "virtualization facility" field 49I, or the "virtual server" field 49J, the corresponding default value will be applied to the physical server 4, the virtualization facility 30, or the virtual server 31. As an example, the default value for the physical server 4 and the virtualization facility 30 may be "impossible," and the default value for the virtual server 31 may be "possible" in accordance with the original purpose of the field 49D.

The data center operation policy management table 50 is a table for managing rules according to the operation policy of the relevant data center. As shown in FIG. 10, the data center operation policy management table 50 is composed of a "rule identifier" field 50A, a "rule parameter" field 50B, a "parameter fixed value" field 50C, a "parameter range" field 50D, an "exception parameter" field 50E, and a "probe method" field 50F.

The "rule identifier" field 50A stores an identifier given to each rule according to the operation policy of the relevant data center (hereinafter referred to as the "rule identifier"), and the "rule parameter" field 50B stores a parameter to which the relevant rule is to be applied. Examples of this parameter include an IP address, a host name, an ID, and a password.

The "parameter fixed value" field 50C stores a fixed value for the parameter defined according to the data center operation policy, and the "parameter range" field 50D stores the parameter range defined for the parameter according to the data center operation policy.

FIG. 10 shows an example in which the range of IP addresses according to the operation policy is defined as from "192.168.0.0" to "192.168.255.255" and "192.168.200.10." FIG. 10 also shows that the host name according to the operation policy should be given in accordance with a naming convention as a combination of "hostname," which is a "fixed value," and an "integer in ascending order" such as "hostname0001", "hostname0002", "hostname0003", and so on up to "hostname1000."

The "exception parameter" field 50E stores exception values in the parameter range defined in the "parameter range" field 50D. For example, FIG. 10 shows that the range from "hostname0500" to "hostname0550" should not be used (for naming purposes) as a host name.

The "probe method" field 50F stores a collection method (probe method) for the management server 2 when collecting a parameter value such as an IP address or a host name from the node to which the management server 2 is connected. For example, FIG. 10 shows that the IP address should be collected from each node by means of "pinging."

In this case, a plurality of probe methods may be registered with the "probe method" field 50F. For example, a plurality of probe methods may be registered with the "probe method" field 50F when a plurality of connection protocols are permitted. Referring to an example shown in FIG. 10, the "probe method" field 50F defines that the host name should be collected from each node in accordance with "SSH (Secure Shell)" and a "combination of rule 3 and rule 4" of the operation policy.

When the management server 2 collects an IP address of each node connected to the management server 2 in the case of the example shown in FIG. 10 described above, the management server 2 probes, by means of "ping" in accordance with "rule 1," the range from "192.168.0.0" to "192.168.255.255" and "192.168.200.10," except from "192.168.0.0" to "192.168.0.2" and "192.168.100.1"; and the management server 2 determines that a node exists at the IP address for which a response is made, and the management server 2 executes processing for registering the node with the server management table 46 (FIG. 6).

Incidentally, "rule 2" in FIG. 10 is the operation policy regarding a "host name" given to each node and is utilized when the host name is used to try connection to the server. "Rule 3" in FIG. 10 is the operation policy regarding a user "ID" registered with each node and is used as a combination with a password (described later) when logging into the node to collect information.

"Rule 4" in FIG. 10 is the operation policy regarding a login "password" set for each node and is used when logging into the node and collecting information. The password is used when SSH or telnet is used to establish connection to the node.

Furthermore, "rule 5" in FIG. 10 is the operation policy regarding a "hardware vendor." Hardware vendors include vendors who provide the physical servers 4 and the virtual servers 31, and vendors who provide server virtualization products; and different connection interfaces and protocols used for information collection may be required, depending on the vendors. Therefore, this information is utilized to recognize the connection interface and protocol when accessing the node to collect information.

Meanwhile, "rule 6" in FIG. 10 is the operation policy regarding the "OS" used by each node. An interface and an information model provided as a standard set may be different depending on the type of OS. Therefore, this information is utilized when accessing the node to collect information.

"Rule 7" in FIG. 10 is the operation policy regarding "middleware" and "applications" packaged in each node. Like the OS, the port, interface, or information model to be accessed when collecting information may be different for each middleware or application. When information needs to be collected and if there is no information about how to collect the necessary information, It is not easy to find, from among many existing connection methods, an information acquisition method that is permitted or packaged for each middleware or application. Therefore, this information is used when collecting the above information.

"Rule 8" in FIG. 10 is the operation policy regarding a "management interface" provided for each node. With an interface for which the management interface is standardized, it is possible to manage platforms provided by different vendors. This information is used for not only collection of information about each platform, but also the setting of values and control of each platform.

"Rule 9" in FIG. 10 is the operation policy regarding an "agent program," which is an example of the program 25. "Rule 9" defines the version of the agent program which is permitted to be deployed.

"Rule 10" in FIG. 10 is the operation policy regarding a "virtualization facility" mounted on the physical server 4. Like the OS, a management method, management interface, or protocol to be provided may be different depending on the type of server virtualization product. This information is used not only for collection of information, but also for the setting of values and control of the virtualization facility. When there is no information, it is not easy to find an information acquisition method permitted or packaged for each virtualization facility 30. However, this information makes it possible to collect information by narrowing down the virtualization facility 30 detected as a result of server probe processing by the server probe program 40.

"Rule 11" in FIG. 10 is the operation policy regarding an IP address of a service processor mounted on the physical server 4. As described later in the second embodiment, there is a platform capable of collecting information via a service processor provided on the physical server 4. In this case, a management interface which is not a server to be managed, but reacts to "pinging" exists. This information is utilized when collecting information about each node via the service processor.

The program management table 51 is a table used by the management server 2 which deploys the program 25 to manage the program 25 to be deployed to the node. As shown in FIG. 11, the program management table 51 is composed of a "program identifier" field 51A, a "deployment destination server type" field 51B, a "deployment destination platform type" field 51C, a "license" field 51D, and a "management level" field 51E.

The "program identifier" field 51A stores an identifier given to each of one or more kinds of programs 25 (hereinafter referred to as the "program identifier"), and the "deployment destination server type" field 51B stores the type of a node (such as a vendor name and a model name) to which the relevant program 25 can be deployed. If the program 25 to be deployed needs to be changed depending on the machine type, it is possible to do so by referring to the value in this "deployment destination server type" field 51B.

The "deployment destination platform type" field 51C stores the type of compatible platform at the node to which the relevant program is deployed. Specifically speaking, the CPU architecture and the OS type are stored in this "deployment destination platform type" field 51C. If the program 25 to be deployed needs to be changed depending on the environment, it is possible to do so by referring to the value in the "deployment destination platform type" field 51C just like the server type stored in the "deployment destination server type" field 51B.

The "license" field 51D is composed of a "used quantity" field 51F, a "remaining quantity" field 51G, and an "expiration date" field 51H. The "used quantity" field 51F, the "remaining quantity" field 51G, and the "expiration date" field 51H store the current used quantity of the relevant program 25, its remaining license quantity, and its expiration date respectively. These pieces of information make it possible to prevent excessive deployment of the program 25 beyond the licensed quantity, and display and report the expiration of the license or an alert of the shortage of licenses to the system administrator. Convenience of management can be improved by providing the management server 2 with an interface for updating and referring to this program management table 51. Incidentally, the management server 2 can update the "used quantity" field 51F and the "remaining quantity" field 51G when the program 25 is successfully deployed to the node, but initial setup by the user is required.

The "management level" field 51E stores a management level indicating the degree of cooperation between the relevant program 25 and the OS and hardware of the node to which the program 25 is deployed. Of the programs 25, there are some programs that will place a load on the node, but can closely cooperate with the OS and hardware, and there are also some programs which will not place a load on the node, but can only loosely cooperate with the OS and hardware. Since different program functions are required for different services and applications, the management policy is used in different manners as required depending on the situation (policy management).

Only two management levels "close" and "loose" are described in this embodiment, but further management levels can be set, thereby making it possible to apply management levels for many different uses. The case where only one management level is prepared is also permitted. In that case too, the advantageous effect of this embodiment will be maintained.

(1-2-3) Processing for Program Deployment Method According to First Embodiment (1-2-3-1) Program Deployment Processing The flow of processing for the program deployment method according to the first embodiment will be explained below. This program deployment processing will be performed in the following procedure as shown in FIG. 11.

When specified monitoring time has come, the server probe program 40 for the management server 2 performs specified server probe processing for detecting a node connected to the management server 2 (SP10).

The "monitoring time" herein used means, for example, periodical monitoring or monitoring based on a schedule. The monitoring time may be set by the user via a UI (User Interface). The monitoring time may be when the configuration of software is changed by, for example, installation, uninstallation, or update of a program. Alternatively, the monitoring time may be when the type or version of the virtual servers 31 and the virtualization facilities 30 is changed, or when the device configuration of the physical servers 4 is changed, or when an alert reporting the type or version change or the device configuration change described above is made to the user.

If new nodes are detected as a result of the server probe processing, the server registration program 41 for the management server 2 registers the nodes with the server management table 46 (FIG. 2) and the server logical information management table 47 (FIG. 2) (SP11).

Subsequently, the server configuration acquisition program 42 for the management server 2 acquires configuration information about the new nodes and updates the server management table 46 and the server logical information management table 47 based on the acquired configuration information (SP12).

Next, the virtualization facility configuration generation program 43 for the management server 2 refers to the server management table 46 and the server logical information management table 47 and then generates the server model information management table 48 (SP13). The generated server model information management table 48 clarifies the topology between the new nodes (the topology between the new physical servers 4, virtualization facilities 30 and virtual servers 31).

Subsequently, the management means judgment program 44 for the management server 2 judges, for each new node detected by the server probe processing in step SP10, whether the program 25 should be deployed to the node or not deployed to the node and be managed by another management method (SP14). If the management means judgment program 44 determines in step SP14 that the program 25 will not be deployed to the new nodes, the management means judgment program 44 then terminates this program deployment processing.

On the other hand, if the management means judgment program 44 determines in step SP14 that the program 25 will be deployed to the new nodes, the deployment execution program 45 for the management server 2 deploys the relevant program to the new nodes, which are the destinations of deployment of the program 25 (SP15), and then terminates this program deployment processing.

(1-2-3-2) Server Probe Processing

Figure 13:
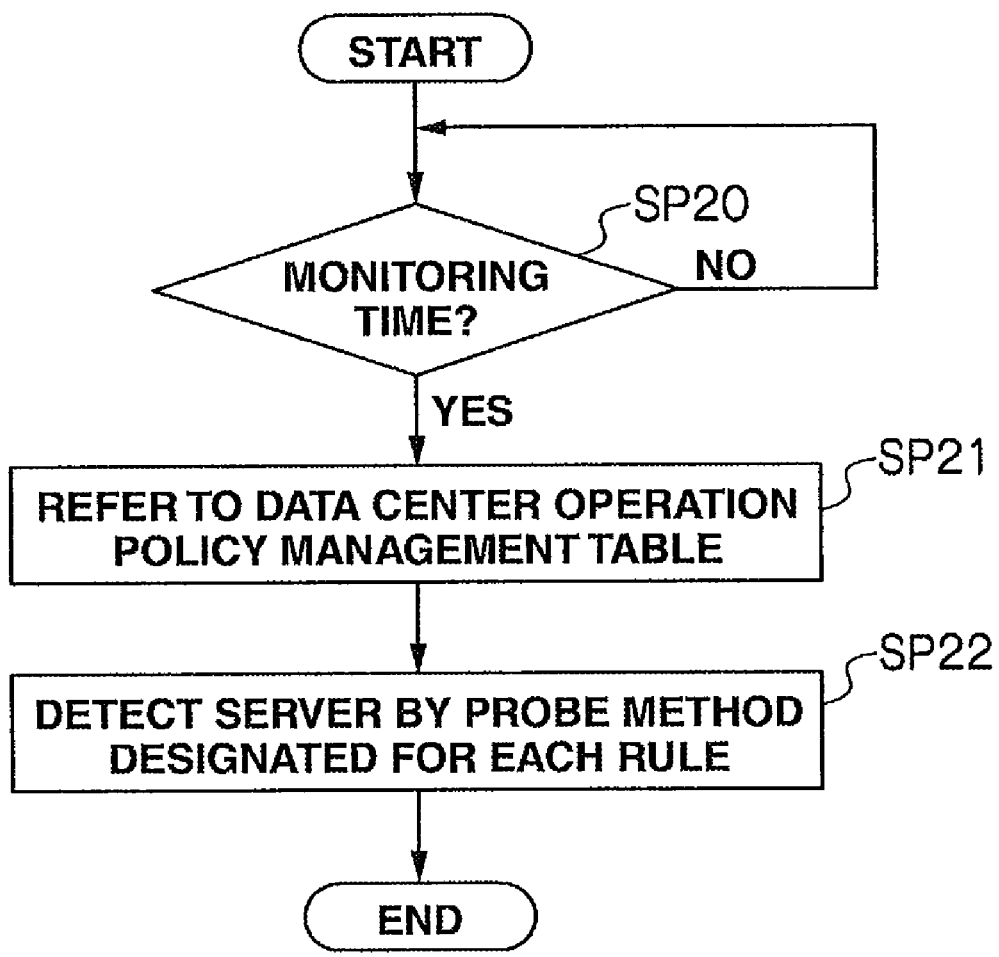
FIG. 13 is a flowchart illustrating a processing sequence for server probe processing.

FIG. 13 shows specific details of processing executed by the server probe program 40 in step SP10 during the program deployment processing.

After the management server 2 is activated, the server probe program 40 starts the server probe processing shown in FIG. 13 and then waits for the specified monitoring time (SP20). When the specified monitoring time has elapsed, the server probe program 40 refers to the data center operation policy management table 50 (FIG. 10) (SP21) and searches the nodes connected to the management server 2 by the designated probe method in accordance with rules stored in the data center operation policy management table 50.

Specifically speaking, the server probe program 40 sends a ping packet to all the IP addresses within the IP address range stored in the data center operation policy management table 50 and then waits for a response to the ping packet from the nodes. The server probe program 40 records the IP addresses from which a response has been made, and the server probe program 40 then determines that the nodes with those IP addresses have been detected.

The server probe program 40 also tries establishing a connection to the nodes by the method of designating host names using a protocol (such as SSH) stored in the "probe method" field 50F in the data center operation policy management table 50 (FIG. 10). An attempted login does not have to result in success; and if there is a node in the state capable of accepting the connection, that means the node having that host name exists, and the server probe program 40 determines that the node has been detected. Incidentally, other methods can be used in order to confirm the existence of the node.

Subsequently, the server probe program 40 activates the server registration program 41 and then terminates this server probe processing.

(1-2-3-3) Server Registration Processing

Figure 12:
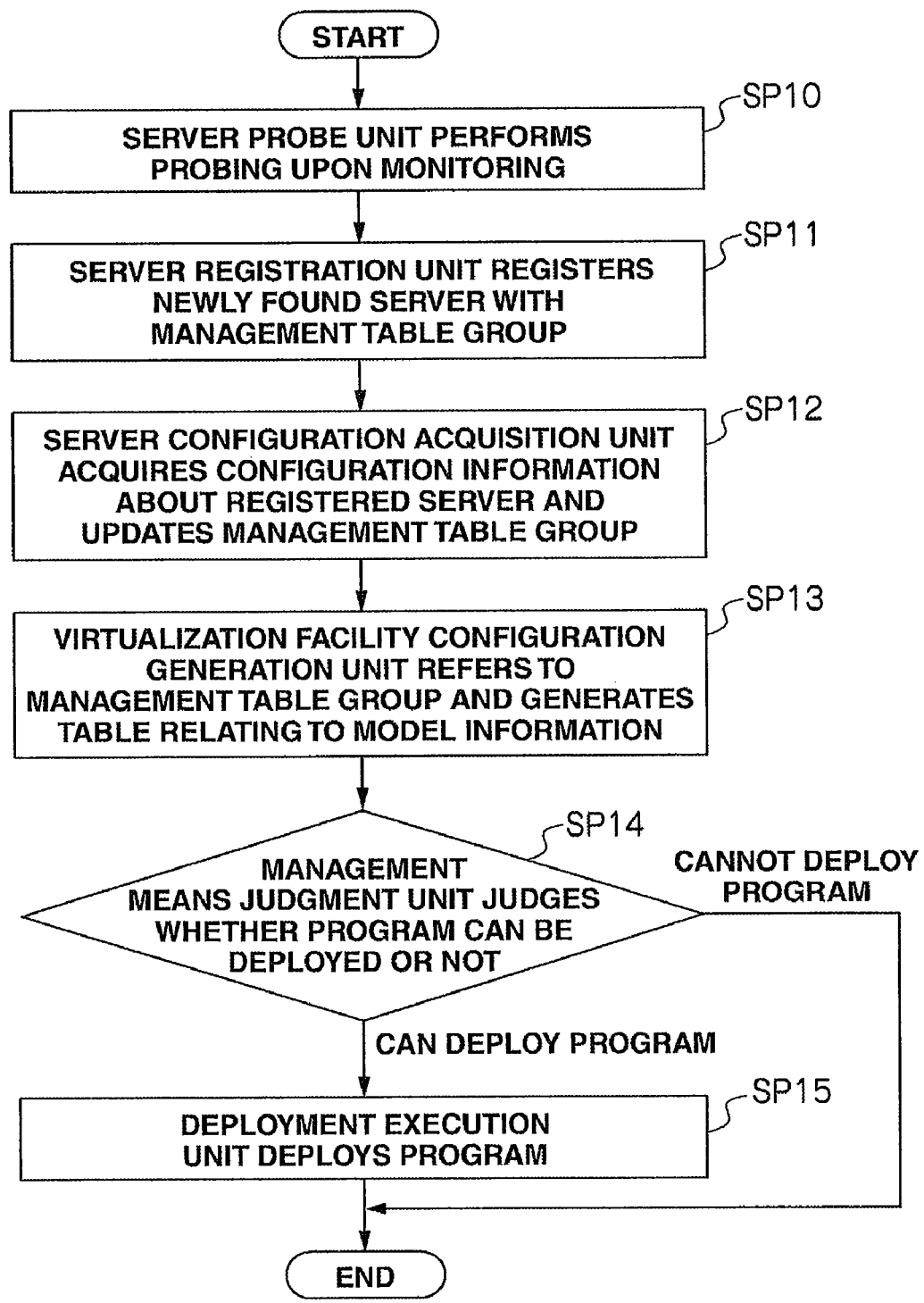
FIG. 12 is a flowchart illustrating a processing sequence for program deployment processing.
Figure 14:
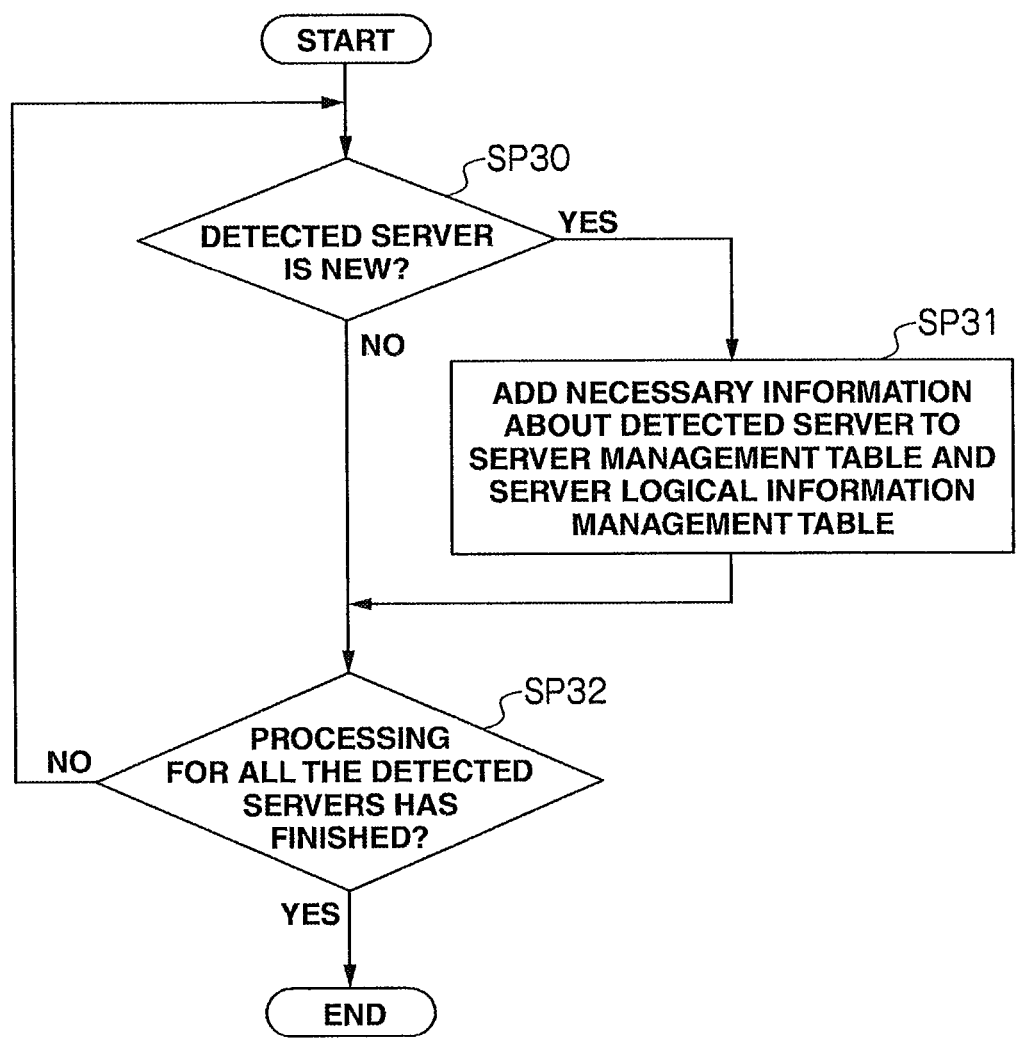
FIG. 14 is a flowchart illustrating a processing sequence for server registration processing.

When the server registration program 41 is activated by the server probe program 40, it executes step SP11 in the program deployment processing described above with reference to FIG. 12 in accordance with the server registration processing sequence shown in FIG. 14.

Specifically speaking, the server registration program 41 selects one node detected by the server probe processing, refers to the server management table 46 (FIG. 6) and the server logical information management table 47 (FIG. 7), and judges whether or not the node is a new node that is not registered yet with the server management table 46 and the server logical information management table 47 (SP30).

If the node was found by a ping, its IP address is known. Therefore, the server registration program 41 refers to the IP information stored in each "IP information" field 47H in the server logical information management table 47 (FIG. 7) and then judges whether or not the IP address of the then target node is stored in any of the "IP information" fields 47H in the server logical information management table 47.

If a negative judgment is returned in step SP30, the server registration program 41 proceeds to step SP32; or if an affirmative judgment is returned in step SP30, the server registration program 41 newly registers necessary pieces of information, from among the various information included in the response received from the relevant node in step SP22 during the server probe processing described above with reference to FIG. 13, with the server management table 46 and the server logical information management table 47 (SP31).

Subsequently, the server registration program 41 judges whether or not the same processing has finished for all the nodes detected by the server probe processing; and if a negative judgment is returned, the processing returns to step SP30. The server registration program 41 then switches to another node selected in step SP30 and repeats the same processing (from SP30 to SP32 and back to SP30).

After finishing the same processing for all the nodes detected by the server probe processing, the server registration program 41 activates the server configuration acquisition program 42 and then terminates this server registration processing.

(1-2-3-4) Server Configuration Acquisition Processing

Figure 15:
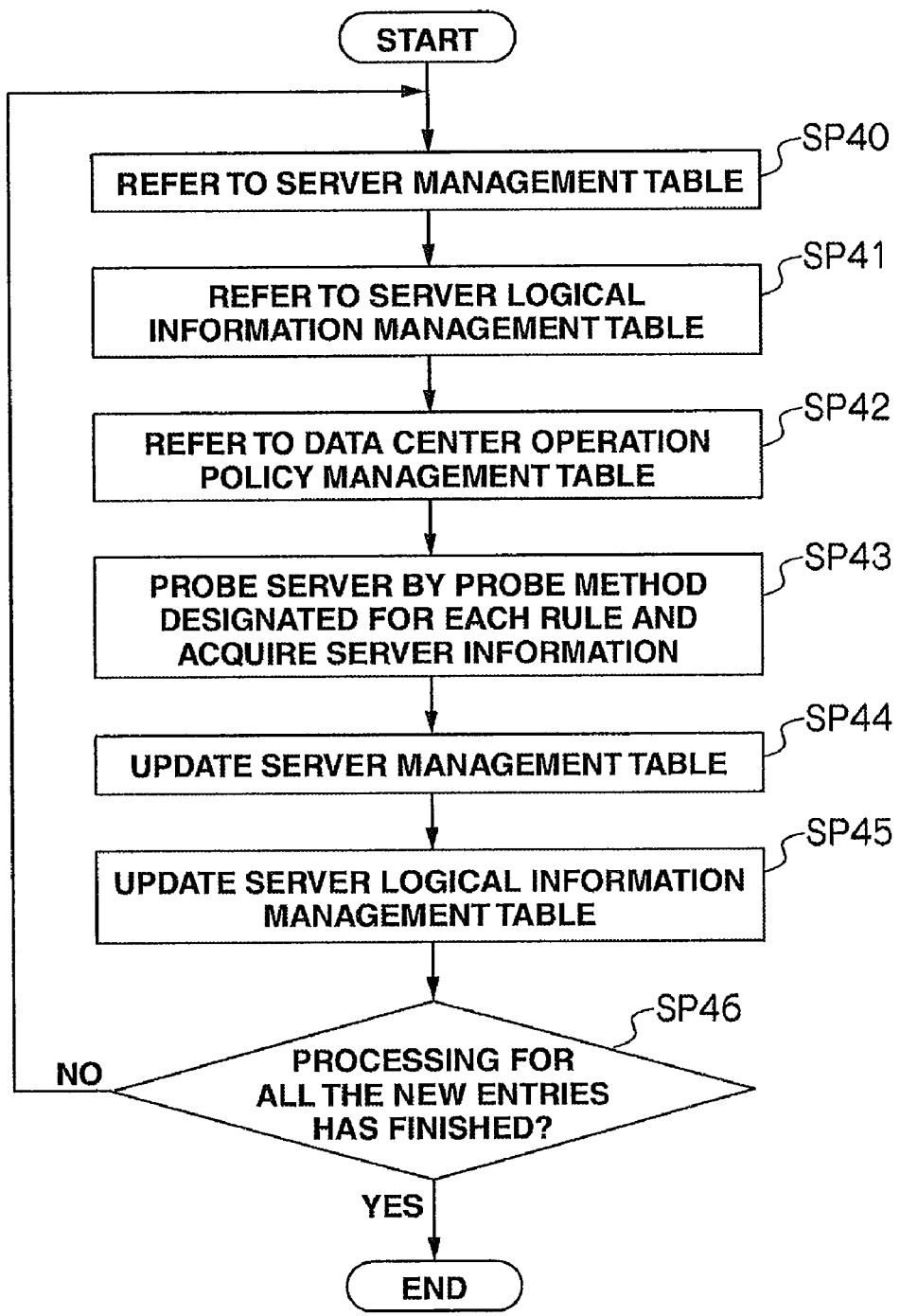
FIG. 15 is a flowchart illustrating a processing sequence for server configuration acquisition processing.

When the server configuration acquisition program 42 is activated by the server registration program 41, it executes step SP13 in the program deployment processing described above with reference to FIG. 12 in accordance with a server configuration information processing sequence shown in FIG. 15.

Specifically speaking, the server configuration acquisition program 42 first refers to the server management table 40 (FIG. 6) and selects one new entry in the server management table 40. The server configuration acquisition program 42 then reads registered information about the selected new entry from the server management table 40 (SP40).

Subsequently, the server configuration acquisition program 42 refers to the server logical information management table 47 (FIG. 7), detects an entry in the server logical information management table 47 corresponding to the new entry selected in step SP40, and reads registered information about that entry (SP41).

Next, the server configuration acquisition program 42 refers to the data center operation policy management table 50 (FIG. 10), and reads rules for acquiring the configuration information about a new node corresponding to the new entry based on the information read from the server management table 46 in step SP40 and the information read from the server logical information management table 47 in step SP41 (SP42).

Then, the server configuration acquisition program 42 probes the new node by a probe method designated by each rule acquired in step SP42 and acquires the configuration information from the new node (SP43). For example, the server configuration acquisition program 42 logs into the new node, using the IP address as well as the ID and password information read from the data center operation policy management table 50. Subsequently, the server configuration acquisition program 42 acquires information about the new node and the OS, using WMI (Windows (registered trademark) Management Instrumentation).

Next, the server configuration acquisition program 42 updates the server management table 46 and the server logical information management table 47 respectively based on the configuration information acquired in step SP43 about the new node (SP44, SP45). At this moment, the server configuration acquisition program 42 stores the ID and password, with which connection to the new node was made successfully in step SP43, in the "management means" field 47K of the relevant entry in the server logical information management table 47 (FIG. 7).

Furthermore, the server configuration acquisition program 42 judges whether or not the processing from step SP40 to step SP45 has finished for all the new entries in the server management table 40 (SP46); and if a negative judgment is returned, the processing returns to step SP40. Subsequently, the server configuration acquisition program 42 switches to another new entry selected in the server management table 40 in step SP40 and then repeats the same processing (from SP40 to SP46 and back to SP40).

After finishing similar processing for all the new entries in the server management table 40, the server configuration acquisition program 42 activates the virtualization facility configuration generation program 43 and then terminates this server configuration acquisition processing.

(1-2-3-5) Virtualization facility Configuration Generation Processing

Figure 16:
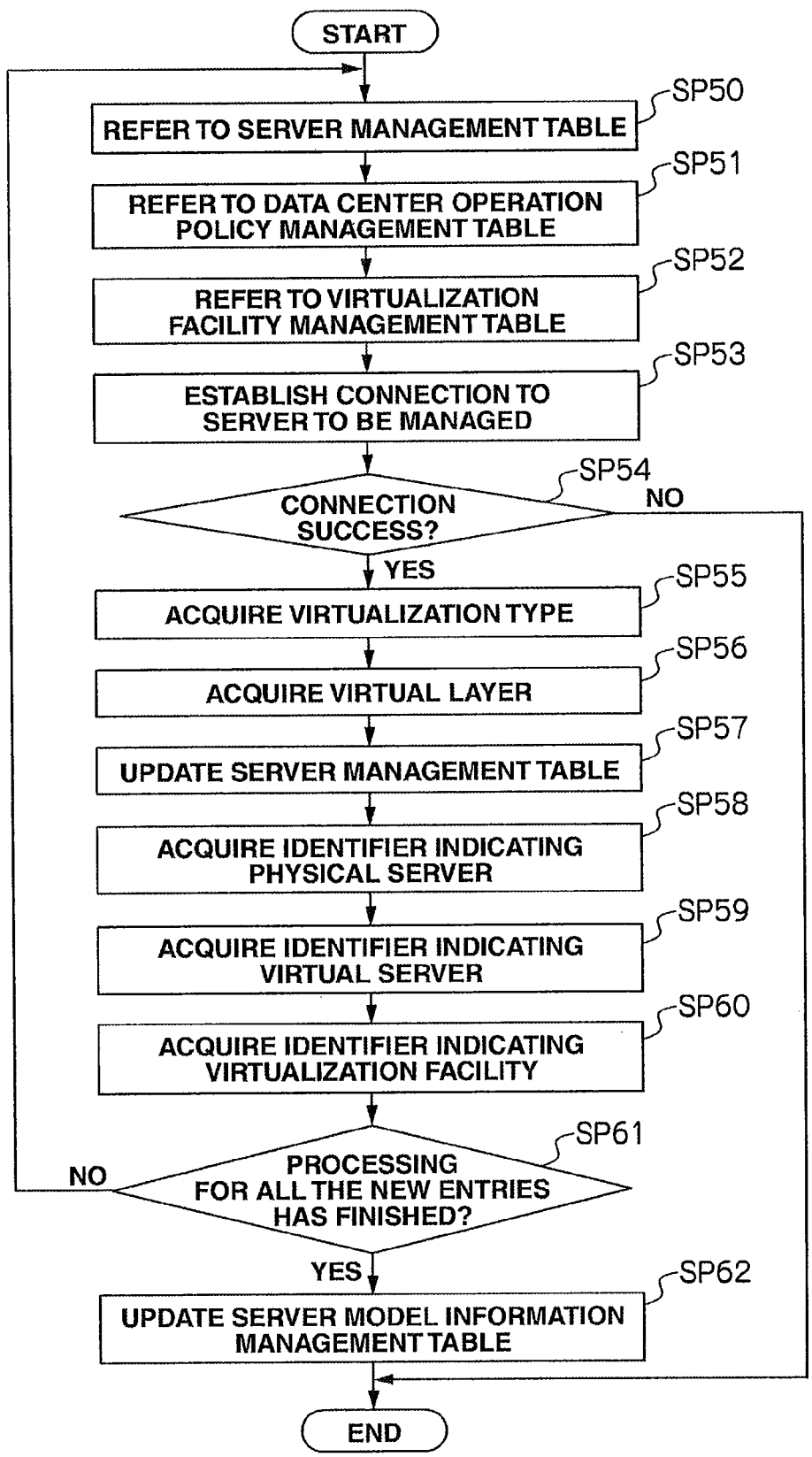
FIG. 16 is a flowchart illustrating a processing sequence for virtualization facility configuration generation processing.

FIG. 16 shows specific details of the processing of the virtualization facility configuration generation program 43 in step SP13 in the program deployment processing described above with reference to FIG. 12. When the virtualization facility configuration generation program 43 is activated by the server configuration acquisition program 42, it executes step SP13 in the program deployment processing in accordance with the virtualization facility configuration generation processing sequence shown in FIG. 16.

Specifically speaking, the virtualization facility configuration generation program 43 first refers to the server management table 46 and selects one new entry in the server management table 40. Then, the virtualization facility configuration generation program 43 reads registered information about the selected new entry from the server management table 46 (SP50).

Next, the virtualization facility configuration generation program 43 refers to the data center operation policy management table 50 and reads the virtualization facility 30 type and the probe method corresponding to the new entry selected in step SP50 from the data center operation policy management table 50 (SP51).

Subsequently, the virtualization facility configuration generation program 43 refers to the virtualization facility management table 49, checks it with the virtualization facility 30 type obtained in step SP51, and acquires an acquisition source, from which identification information for identifying the virtualization facility 30 can be acquired, an acquisition method, and protocol to be used when acquiring the identification information, from the "identification" field 49C in the virtualization facility management table 49 (FIG. 9) (SP52). Examples of such identification information acquisition source include a virtualization facility management interface 36 (FIG. 4) and any of the virtual servers shown in FIG. 9. Also, a service console can be the identification information acquisition source. The service console is a virtual server specially provided for the management purpose from among the virtual servers 31 and includes a management information acquisition interface and a control interface.

Next, the virtualization facility configuration generation program 43 tries establishing connection to the new node detected in step SP50 (SP53), and then judges whether this connection was established successfully or not (SP54).

If a negative judgment is returned in SP54, the virtualization facility configuration generation program 43 terminates this virtualization facility configuration generation processing; or if an affirmative judgment is returned in SP54, the virtualization facility configuration generation program 43 acquires information about the virtualization type and the virtual layer of the connected new node from that new node (SP55, SP56). Then, the virtualization facility configuration generation program 43 stores the thus obtained information (the virtualization type and the virtual layer) in the server management table 46 (SP57).

Next, the virtualization facility configuration generation program 43 acquires necessary respective node identifiers from the connected new node (SP58 to SP60).

Specifically speaking, if the connected node is a physical server 4, the virtualization facility configuration generation program 43 acquires, from the physical server 4, a node identifier for the physical server 4, a node identifier for the virtualization facility 30 which is active on that physical server 4, and a node identifier for each virtual server 31 provided by the virtualization facility 30.

If the connected node is a virtualization facility 30, the virtualization facility configuration generation program 43 acquires, from the virtualization facility 30, a node identifier for the physical server 4 on which the virtualization facility 30 is active, a node identifier for the virtualization facility 30, and a node identifier for each virtual server 31 provided by the virtualization facility 30.

If the connected node is a virtual server 31, the virtualization facility configuration generation program 43 acquires, from the virtual server 31, a node identifier for the physical server on which that virtual server 31 is created, a node identifier for the virtualization facility 30 providing that virtual server 31, and node identifiers for all the virtual servers 31 including that virtual server 31 provided by the virtualization facility 30.

Subsequently, the virtualization facility configuration generation program 43 judges whether or not the processing from step SP50 to step SP60 has finished for all the new entries in the server management table 40 (SP61); and if a negative judgment is returned, the processing returns to step SP50. Then, the virtualization facility configuration generation program 43 switches to another new entry selected from the server management table 40 in step SP50 and repeats the same processing (from SP50 to SP60 and back to SP50).

After finishing the same processing for all the new entries in the server management table 40, the virtualization facility configuration generation program 43 stores the above-obtained node identifiers for the respective new nodes in the server model information management table 48 by making the new nodes be associated with each other in accordance with the lineage between the new nodes (the topology between the new physical servers 4, virtualization facilities 30, and virtual servers 31) (SP62).

As a result of the above-described processing, the server model information management table 48 is completed and the topology between the physical servers 4, the virtualization facilities 30, and the virtual servers 31 is clarified. Consequently, it is possible to prevent the program 25 from being deployed to the virtualization facilities 30 on which the virtual servers 31 are active, or to the physical servers 4.

Subsequently, the virtualization facility configuration generation program 43 activates the management means judgment program 44 and then terminates this virtualization facility configuration generation processing.

(1-2-3-6) Management Means Judgment Processing

Figure 17:
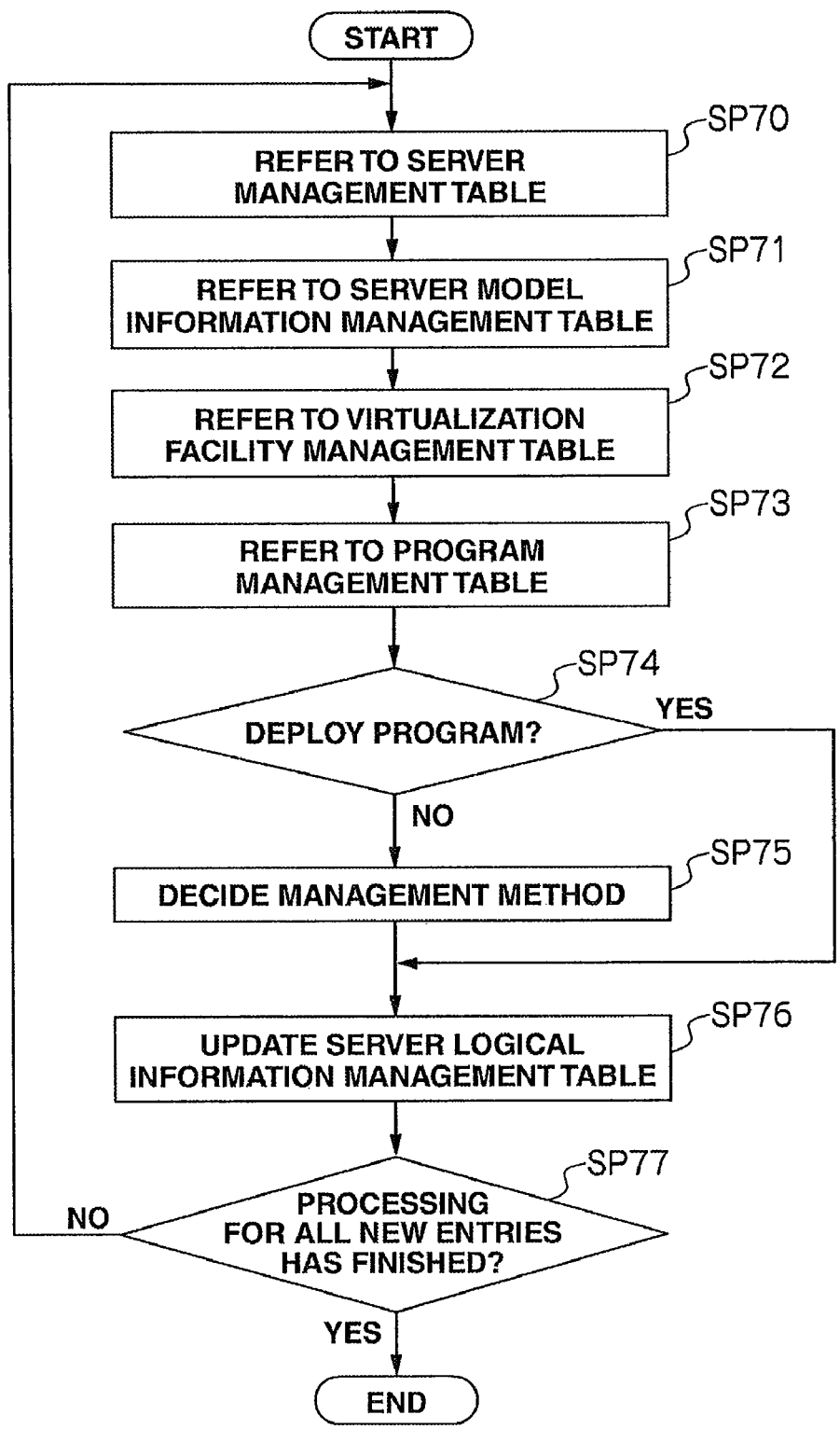
FIG. 17 is a flowchart illustrating a processing sequence for management means judgment processing.

When the management means judgment program 44 is activated by the virtualization facility configuration generation program 43, it executes step SP14 in the program deployment processing described above with reference to FIG. 12 in accordance with the management means judgment processing sequence shown in FIG. 17.

Specifically speaking, the management means judgment program 44 first refers to the server management table 46 and selects one new entry from the server management table 46. Then, the management means judgment program 44 reads registered information about the selected new entry (the node identifier, the virtualization type, and the virtual layer) from the server management table 46 (SP70).

Next, the management means judgment program 44 reads a virtual layer of the new node corresponding to each new entry detected in step SP70 from the server model information management table 48 (SP71).

Subsequently, the management means judgment program 44 reads information indicating the possibility of installation of the program 25 on the new node from the "program installation possibility" field 49D in the virtualization facility management table 49 (SP72).

Furthermore, the management means judgment program 44 refers to the program management table 51, judges whether any program 25 that corresponds with the hardware and OS information about the new node exists or not, and checks license information about the program 25 (SP73).

The management means judgment program 44 then judges whether the program 25 should be deployed to the new node or not (SP74). Specifically speaking, the management means judgment program 44 judges whether the program 25 that corresponds with the hardware and OS information about the new node exists or not, whether the license of the program 25 is still effective or not, and whether the program 25 can be deployed to the new node or not. When all the above-described conditions are satisfied, an affirmative judgment on the new node is returned in step SP74.

If an affirmative judgment is returned in step SP74, the management means judgment program 44 proceeds to step SP76; and if a negative judgment is returned in step SP74, the management means judgment program 44 chooses another management means that does not use the program 25, as a means for managing the new node (SP75). For example, the connection method which resulted in success when the server configuration acquisition program 42 collected the configuration information in step SP43 in the server configuration acquisition processing described above with reference to FIG. 15 is stored in the "management means" field 47K in the server logical information management table 47 (FIG. 7). Therefore, the management means judgment program 44 chooses that connection method as "another management means."

Subsequently, if the management means judgment program 44 is going to deploy the program 25, it stores information to that effect in the relevant "management means" field 47K in the server logical information management table 47; or if the management means judgment program 44 is not going to deploy the program 25, it stores the management means chosen in step SP75 in the relevant "management means" field 47K in the server logical information management table 47 (SP76).

Then, the management means judgment program 44 judges whether or not the processing from step SP70 to step SP76 has finished for all the new entries in the server management table 40 (SP77); and if a negative judgment is returned, the processing returns to step SP70. Subsequently, the management means judgment program 44 switches to another new entry selected from the server management table 40 in step SP70 and repeats the same processing (from SP70 to SP77 and back to SP70).

After finishing the same processing for all the new entries in the server management table 40, the management means judgment program 44 activates the deployment execution program 45 and then terminates this management means judgment processing.

(1-2-3-7) Deployment Execution Processing

Figure 18:
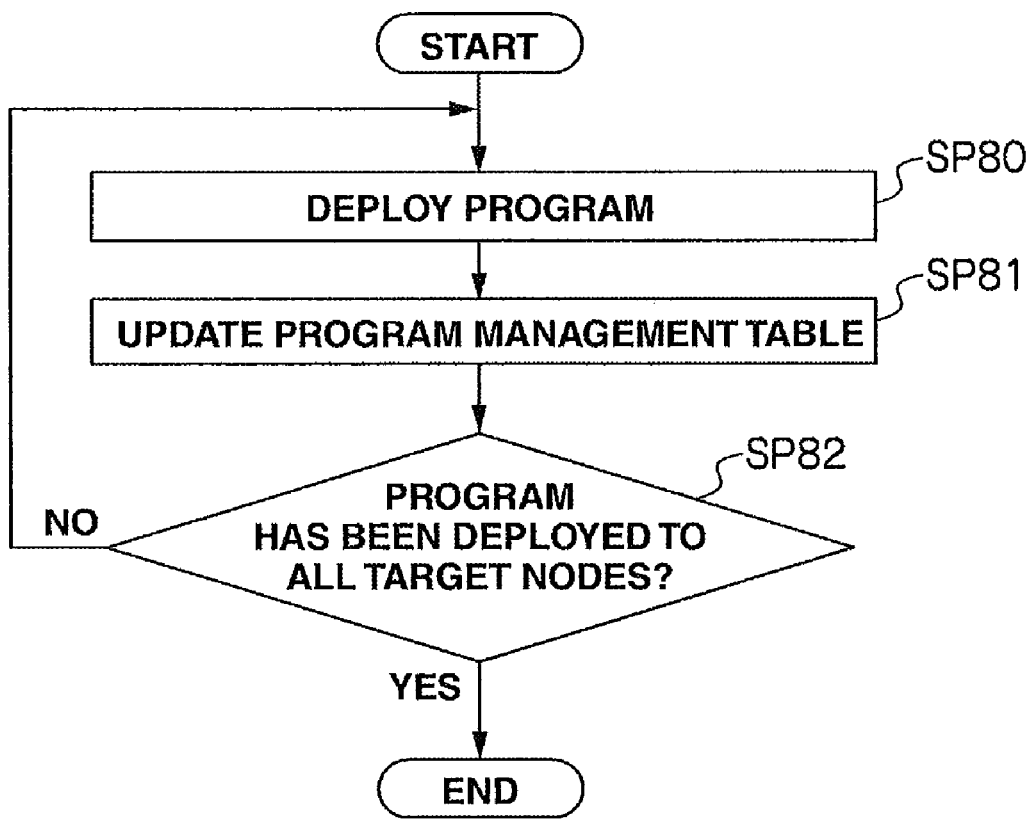
FIG. 18 is a flowchart illustrating a processing sequence for deployment execution processing.

When the deployment execution program 45 is activated by the management means judgment program 44, it executes step SP15 in the program deployment processing described above with reference to FIG. 12 in accordance with the deployment execution processing sequence shown in FIG. 18.

Specifically speaking, when the deployment execution program 45 is activated by the management means judgment program 44, it first selects one node which was chosen as a deployment destination of the program 25 in step SP74 in the management means judgment processing described above with reference to FIG. 17; and the deployment execution program 45 deploys the program 25 corresponding to the node to the node (SP80).

As a deployment method used in this step, a method of deploying the program 25 and executing an installer by means of RCP (Remote Copy) and RSH (Remote Shell) may be used, or deployment software may be used. A number of means for deploying the program 25 may be tried as deployment procedures, with the best method then being selected.

Next, the deployment execution program 45 updates the "license" field 51D in the program management table 51 (FIG. 11) based on the result of the program deployment in step SP80 (SP81).

Then, the deployment execution program 45 judges whether or not the program 25 has been deployed to all the nodes which were chosen as the destinations of deployment of the program 25 in the management means judgment processing (FIG. 17) (SP82); and if a negative judgment is returned, the processing returns to step SP80. Subsequently, the deployment execution program 45 switches to another node selected in step SP80 and repeats the same processing (from SP80 to SP82 and back to SP80).

After finishing the same processing for all the target nodes, the deployment execution program 45 terminates this deployment execution processing.

(1-4) Advantageous Effects of First Embodiment

With the server system 1 according to the first embodiment described above, the management server 2 collects the configuration information about each node connected via the first network switch 3 to the management server 2 and selectively deploys, based on the configuration information, the program 25 to the nodes to which the program 25 can be deployed. Therefore, the operation can be performed to, for example, deploy the program 25 to the virtual servers 31 and the physical servers with inactive virtualization facilities 30, and not deploy the program 25 to the physical servers 4 and virtual servers 31 incompatible with the program 25 or the physical servers 4 with active virtualization facilities. As a result, a server system capable of reducing the workload on the system administrator and improving convenience can be constructed.

(2) Second Embodiment

Figure 19:
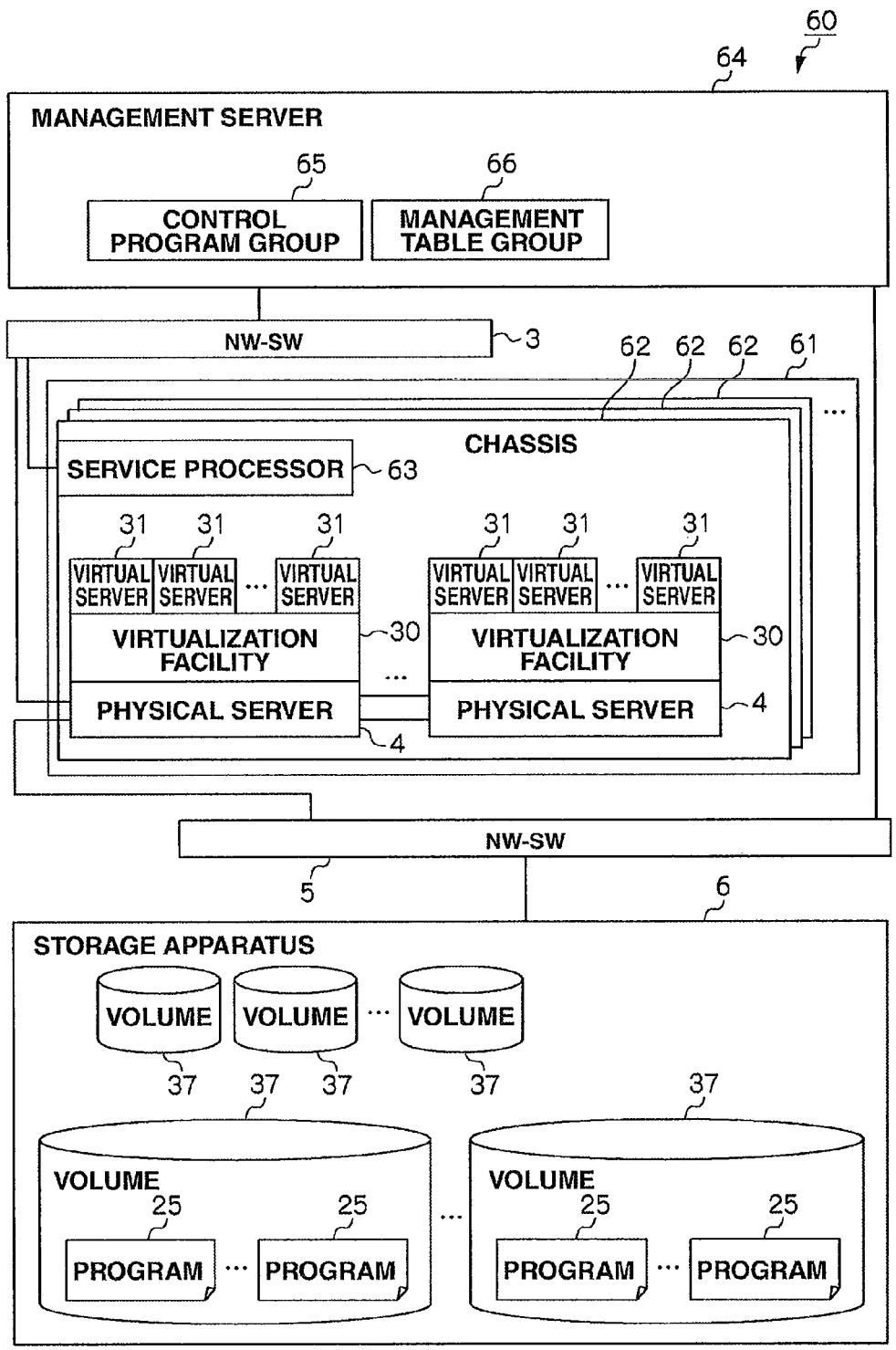
FIG. 19 is a block diagram showing the schematic configuration of a server system according to the second embodiment.

FIG. 19 shows a server system 60 according to the second embodiment of the invention, with elements similar to those shown in FIG. 1 given the same reference numerals as those in FIG. 1. The difference between the server system 60 and the server system 1 according to the first embodiment (FIG. 1) is that the destination to which the program 25 is deployed is a blade server 61.

The blade server 61 includes a plurality of chassis 62, and one or more physical servers 4 are contained in (inserted into) each chassis 62. Each chassis 62 is provided with a service processor 63. The physical servers 4 in the same chassis 62 can be managed (for, for example, information acquisition and power control), using the service processor 63.

A management server 64 can acquire information about the physical servers 4 in the same chassis 61 from the service processor 63. The management server 64 can also acquire information about the virtualization facilities 30 which are active on the physical servers 4, and information about the virtual servers 31 provided by the virtualization facilities 30, sequentially via the service processor 63 in the same chassis 62 and then the virtualization facility management interface 36 for the virtualization facilities 30 (FIG. 4).

FIG. 20 shows a server model information management table 67 according to the second embodiment that constitutes a management table group 66 (FIG. 19) for the management server 60 together with the server management table 46, server logical information management table 47, virtualization facility management table 49, data center operation policy management table 50, and program management table 51 described above with reference to FIG. 6, FIG. 7, and FIGS. 9 to 11.

Figure 21:
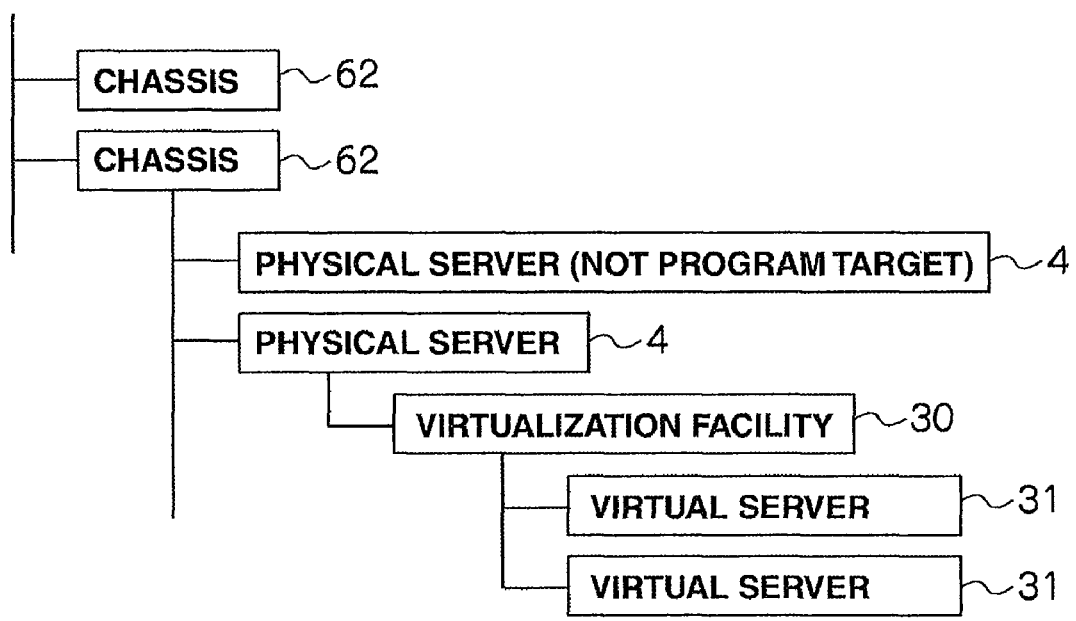
FIG. 21 is a conceptual diagram showing the topology between chassis, physical servers, a virtualization facility, and virtual servers according to the second embodiment.

In the second embodiment, the topology between the chassis 62 (the service processor 63), the physical servers 4, the virtualization facilities 30, and the virtual servers 31 has a hierarchical structure shown in FIG. 21. Therefore, the server model information management table 67 according to the second embodiment is composed by adding a "service processor" field 67A to the server model information management table 48 according to the first embodiment as described above with reference to FIG. 8.

This server model information management table 67 can be created by acquiring information about the physical servers 4 and the virtualization facilities 30 from the service processor 63 and by having the service processor 63 acquire information about the virtual servers 31 from the virtualization facility management interface 36 (FIG. 4).

Figure 22:
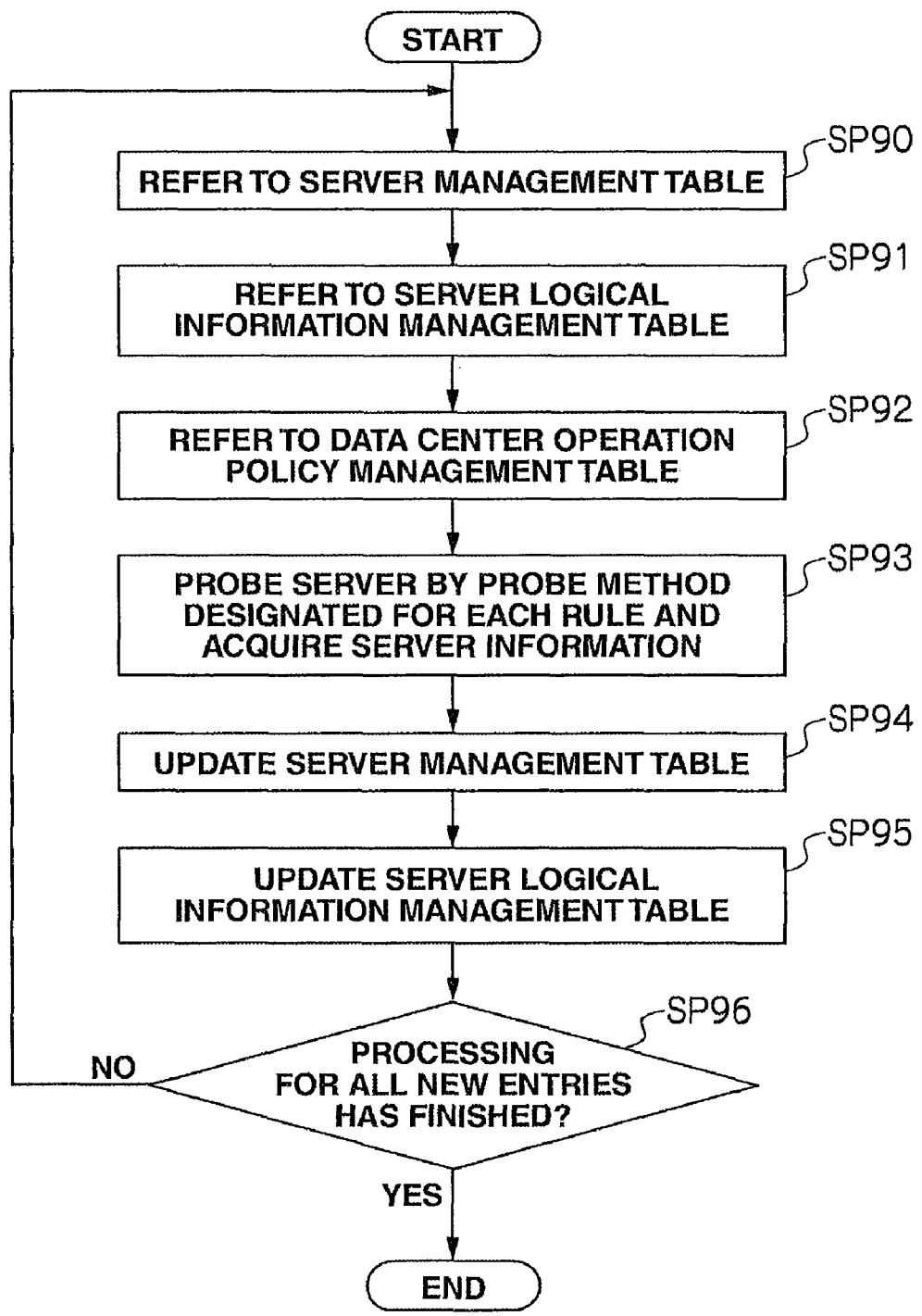
FIG. 22 is a flowchart illustrating a processing sequence for server configuration acquisition processing according to the second embodiment.

FIG. 22 shows the flow of server configuration acquisition processing according to the second embodiment that is performed in step SP12 in the program deployment processing described above with reference to FIG. 12. This server configuration acquisition processing is executed by a server configuration acquisition program 68 (FIG. 2) according to the second embodiment that, together with the server probe program 40, server registration program 41, virtualization facility configuration generation program 43, management means judgment program 44, and deployment execution program 45 described above with reference to FIG. 2, constitutes the control program group 65 for the management server 64.

Specifically speaking, when the server configuration acquisition program 68 is activated by the server registration program 41, it starts this server configuration acquisition processing and executes step SP90 to step SP92 in the same manner as step SP40 to step SP42 for the server configuration acquisition processing according to the first embodiment as described above with reference to FIG. 15.

Subsequently, the server configuration acquisition program 68 probes the new node using the probe method designated based on each rule acquired in step SP92 and acquires configuration information about the new node from the new node (SP93). This embodiment is characterized in that for the above-described purpose, the server configuration acquisition program 68 connects to the service processor 63 for the relevant chassis 62, but not to each new node.

Specifically speaking, the server configuration acquisition program 68 connects to the service processor 63, using the IP address, ID, and password information about the service processor 63 obtained based on the rules acquired in step SP92, acquires information via the packaged UI and also acquires information about the physical servers 4 and the virtualization facilities 30. Also, the server configuration acquisition program 68 acquires information about the virtual servers 31 via the service processor 63 and then the virtualization facility management interface 36 (FIG. 4). The OS information is acquired using the method explained in the first embodiment.

By acquiring necessary information via the service processor 63 as described above, information about the physical servers 4 (blade servers) inserted into the same chassis 62 can be collected promptly and with certainty, without the need to attempt to connect to all the nodes.

Subsequently, the server configuration acquisition program 68 executes step SP94 to step SP96 in the same manner as in step SP44 to step SP46 in the server configuration acquisition processing according to the first embodiment as described above with reference to FIG. 15, and then terminates this server configuration acquisition processing.

In this way, the server system 60 according to the second embodiment can selectively deploy the program 25 to the blade servers 61 as well.

(3) Other Embodiments

The aforementioned embodiments describe the case where the management server 2 or 64 in which this invention is utilized is configured as shown in FIG. 1 or FIG. 19. However, the invention is not limited to this example, and a wide variety of other configurations can be utilized in the management server 2 or 64.

Also, the aforementioned embodiments describe the case where the detection unit for detecting one or more nodes which are connected via the first network switch 3 and are any of the physical servers 4, the virtualization facilities 30, and the virtual servers 31 is constituted from the CPU 10 for the management server 2 or 64 and the server probe program 40; and the acquisition unit for acquiring, for each detected node, the first configuration information about the virtual layer of the node is constituted from the CPU 10 for the management server 2 or 64 and the server configuration acquisition program 42; and the deployment unit for selectively deploying a program to the relevant node based on the first configuration information about each acquired node is constituted from the CPU 10 for the management server 2 or 64, the virtualization facility configuration generation program 43, the management means judgment program 44, and the deployment execution program 45. However, the invention is not limited to this example, and a wide variety of other configurations can be utilized for the detection unit, the acquisition unit, and the deployment unit.

Furthermore, the aforementioned embodiments describe the case where the program to be deployed is the management program 25. However, the invention is not limited to this example, and can be utilized when programs other than the program 25 are deployed.

The present invention can be utilized in a wide variety of information processing apparatuses other than management servers for a server system.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A management server connected, via a first network, to one or more physical servers that are connected to a storage apparatus via a second network, at least one of the physical servers being a physical server with a virtualization facility for providing one or more split resources that are made by virtualizing and splitting a resource of the physical server, the management server comprising:

a detection unit for detecting one or more nodes which are any of the physical servers, the virtualization facility, and the split resources and connected via the first network;

an acquisition unit for acquiring, for each node detected by the detection unit, first configuration information about a virtual layer of the node; and a deployment unit for deploying a program to each node based on the first configuration information for each node that is acquired by the acquisition unit, wherein, the deployment unit:

detects a topology for each node based on the first configuration information corresponding to the node, does not deploy the program to the virtualization facility and the physical server which are incompatible with the program, but deploys the program to the physical server on which the virtualization facility is inactive and the split resources corresponding to the physical server on which the virtualization facility is inactive, and the management server manages, via the deployed program, the physical server on which the virtualization facility is inactive and the split resources corresponding to the physical server on which the virtualization facility is inactive.

2. The management server according to claim 1 wherein the split resources are a virtual server.

3. The management server according to claim 1, wherein the acquisition unit acquires second configuration information for each node detected by the detection unit about the type of operation system mounted on the node; and the deployment unit decides the type of program to be deployed to the node based on the second configuration information corresponding to the node.

4. The management server according to claim 1, wherein the acquisition unit acquires third configuration information for each node detected by the detection unit about a service for which the node is used; and the deployment unit decides the type of the program to be deployed to the node based on the third configuration information corresponding to the node.

5. The management server according to claim 1, wherein the acquisition unit stores a table in which at least one piece of information from among: an information acquisition source for acquisition of the first configuration information for the virtualization facility, a method for identifying the virtualization facility, and a communication protocol for connection with the information acquisition source is registered for each type of virtualization facility; and when judging the type of virtualization facility, the acquisition unit attempts, for each type of virtualization facility stored in the table, access to the information acquisition source according to the communication protocol and identification processing by the identification method, and then judges the type of virtualization facility based on the success of the attempt.

6. The management server according to claim 1, wherein the deployment unit judges, based on license information of the program, whether the program can be deployed or not.

7. The management server according to claim 1, wherein the deployment unit deploys the program by establishing connection to the node by a connection method used when the acquisition unit acquires the first configuration information from the node to which the program is to be deployed.

8. A management server method performed by a management server connected, via a first network, to one or more physical servers that are connected to a storage apparatus via a second network, at least one of the physical servers being a physical server with a virtualization facility for providing one or more split resources that are made by virtualizing and splitting a resource of the physical server, the management server method comprising:

a first step of detecting one or more nodes which are any of the physical servers, the virtualization facility, and the split resources and connected via the first network;

a second step of acquiring, for each detected node, first configuration information about a virtual layer of the node; and a third step of deploying a program to each node based on the first configuration information for each node acquired in the second step, wherein, the third step includes:

detecting a topology for each node based on the first configuration information corresponding to the node, and not deploying the program to the virtualization facility and the physical server which are incompatible with the program, but deploying the program to the physical server on which the virtualization facility is inactive, and the split resources corresponding to the physical server on which the virtualization facility is inactive, and the management server manages, via the deployed program, the physical server on which the virtualization facility is inactive and the split resources corresponding to the physical server on which the virtualization facility is inactive.

9. The management server method according to claim 8, wherein the split resources are a virtual server.

10. The management server method according to claim 8, wherein in the second step, second configuration information about the type of operation system mounted on the node is acquired for each detected node; and in the third step, the type of program to be deployed to the node is decided based on the second configuration information corresponding to the node.

11. The management server method according to claim 8, wherein in the second step, third configuration information about a service for which the node is used is acquired for each detected node; and the type of program to be deployed to the node is decided based on the third configuration information corresponding to the node.

12. The management server method according to claim 8, wherein in the second step, when judging the type of virtualization facility based on a table in which at least one piece of information from among: an information acquisition source for acquisition of the first configuration information for the virtualization facility, a method for identifying the virtualization facility, and a communication protocol for connection with the information acquisition source is registered for each type of virtualization facility, access to the information acquisition source according to the communication protocol and identification processing by the identification method are attempted for each type of virtualization facility stored in the table, and then the type of virtualization facility is judged based on the success of the attempt.

13. The management server method according to claim 8, wherein in the third step, whether the program can be deployed or not is judged based on license information of the program.

* * * * *